(12) United States Patent
Hosotani et al.

(10) Patent No.: US 12,046,404 B2
(45) Date of Patent: Jul. 23, 2024

(54) PLANAR ARRAY COIL AND SWITCHING POWER SUPPLY DEVICE

(71) Applicant: Murata Manufacturing Co., Ltd., Kyoto-fu (JP)

(72) Inventors: Tatsuya Hosotani, Nagaokakyo (JP); Osamu Miki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 805 days.

(21) Appl. No.: 17/125,677

(22) Filed: Dec. 17, 2020

(65) Prior Publication Data

US 2021/0104350 A1 Apr. 8, 2021

Related U.S. Application Data

(63) Continuation of application No. PCT/JP2019/007492, filed on Feb. 27, 2019.

(30) Foreign Application Priority Data

Aug. 17, 2018 (JP) .................. 2018-153374

(51) Int. Cl.
*H01F 27/28* (2006.01)
*H02M 3/155* (2006.01)
*H01F 41/04* (2006.01)

(52) U.S. Cl.
CPC ........ *H01F 27/2804* (2013.01); *H02M 3/155* (2013.01); *H01F 2027/2809* (2013.01); *H01F 41/041* (2013.01)

(58) Field of Classification Search
CPC ......... H01F 27/2804; H01F 2027/2809; H01F 27/255; H01F 27/346; H01F 27/366;

(Continued)

(56) References Cited

U.S. PATENT DOCUMENTS 5,578,981 A * 11/1996 Tokuda ............... H01F 17/0013
336/200
6,114,938 A * 9/2000 Iida ..................... H01F 17/0006
336/200

(Continued)

FOREIGN PATENT DOCUMENTS

JP   S61173166 U   10/1986
JP   H08181018 A   7/1996
(Continued)

OTHER PUBLICATIONS

International Search Report issued in PCT/JP2019/007492; mailed Apr. 23, 2019.

(Continued)

*Primary Examiner* — Mang Tin Bik Lian
(74) *Attorney, Agent, or Firm* — Studebaker & Brackett PC

(57) ABSTRACT

A planar array coil includes a multilayer substrate at which a plurality of coils are formed and arranged on a plane of the multilayer substrate. First ends of the plurality of coils are connected to switching circuit units of a power conversion circuit, and second ends of the plurality of coils are connected to a common output part. The coils include two coil parts in which currents flow in opposite rotation directions, and one coil part of one coil is adjacent to one coil part of another coil. The plurality of coils are connected such that operation of switching circuits causes currents in regions of adjacent coil parts that extend in parallel to each other to flow in the same direction. Accordingly, adverse effects by unwanted coupling between adjacent coils are reduced and a switching power supply device that includes the planar array coil performs stable power conversion operations.

15 Claims, 20 Drawing Sheets

(58) Field of Classification Search
CPC ............... H01F 37/00; H01F 17/0013; H01F 2017/0073; H01F 2017/048
See application file for complete search history.

(56) References Cited

U.S. PATENT DOCUMENTS

| | | | | |
|---|---|---|---|---|
| 6,189,202 | B1* | 2/2001 | Masuda | H01F 41/064 336/212 |
| 6,950,006 | B1* | 9/2005 | Shikama | H01F 27/022 336/200 |
| 7,535,330 | B2* | 5/2009 | Erickson | H03F 3/08 336/200 |
| 9,019,065 | B2* | 4/2015 | Gianesello | H01F 27/346 336/200 |
| 2001/0028292 | A1* | 10/2001 | Iida | H01F 21/12 336/200 |
| 2001/0030593 | A1* | 10/2001 | Imada | H01F 17/0013 336/200 |
| 2002/0083575 | A1* | 7/2002 | Anbo | H01F 17/0013 336/221 |
| 2006/0006973 | A1* | 1/2006 | Iwase | H01F 17/0013 336/200 |
| 2011/0148733 | A1* | 6/2011 | Fahs | H01P 5/10 343/859 |
| 2019/0115135 | A1* | 4/2019 | Yoon | H01F 27/292 |
| 2021/0104351 | A1* | 4/2021 | Hosotani | H01F 17/0006 |

FOREIGN PATENT DOCUMENTS

| | | |
|---|---|---|
| JP | 2001358493 A | 12/2001 |
| JP | 2006024739 A | 1/2006 |
| JP | 2015073052 A | 4/2015 |
| JP | 2015231311 A | 12/2015 |

OTHER PUBLICATIONS

International Preliminary Report on Patentability and Written Opinion issued in PCT/JP2019/007492; issued Feb. 23, 2021.

* cited by examiner

FIG. 2
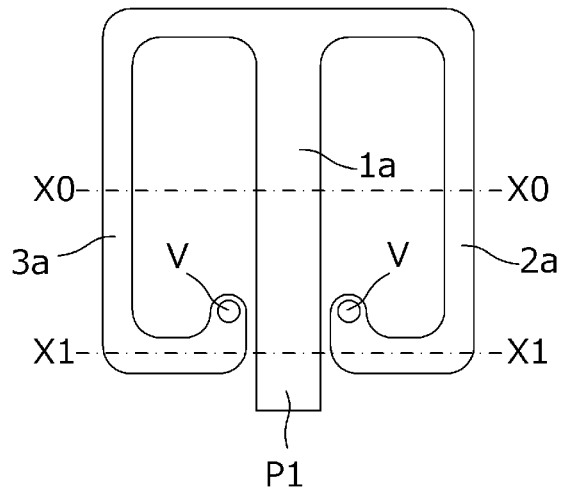
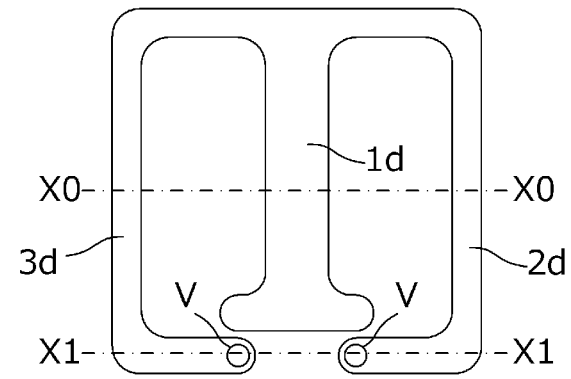
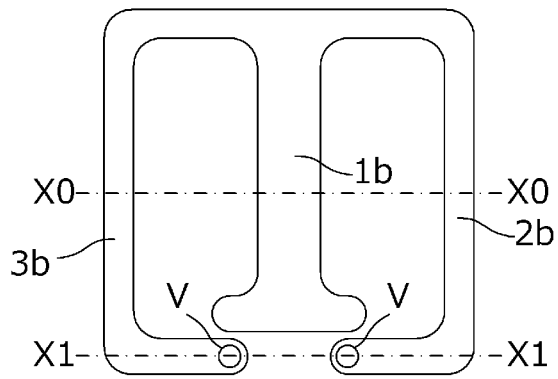
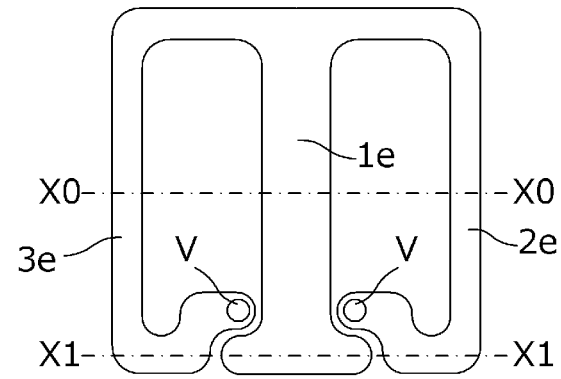
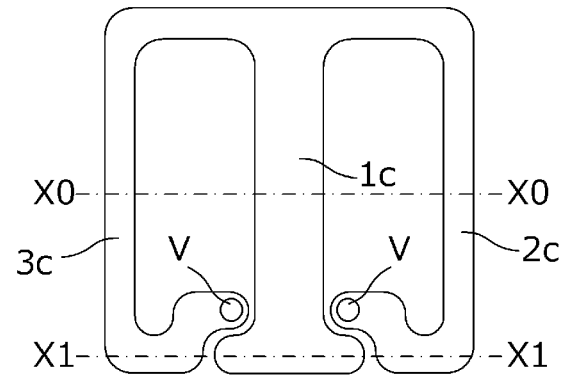
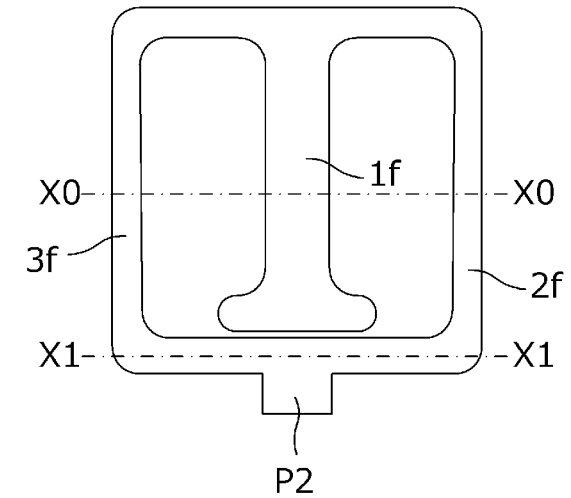

FIG. 10
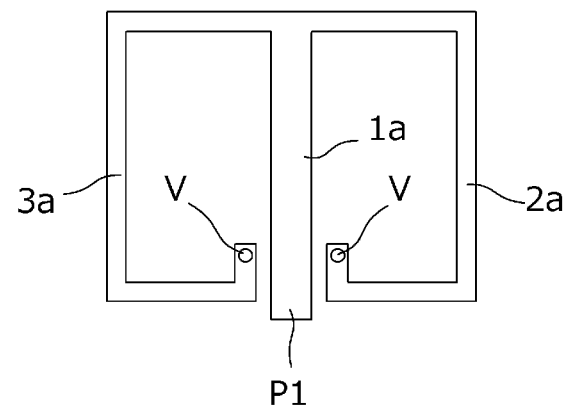
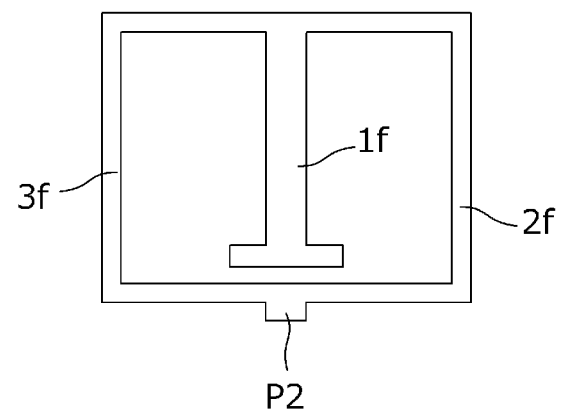

FIG. 11
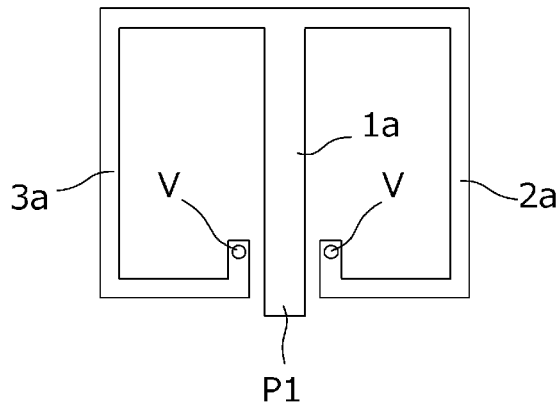
FIRST LAYER (FRONT LAYER)
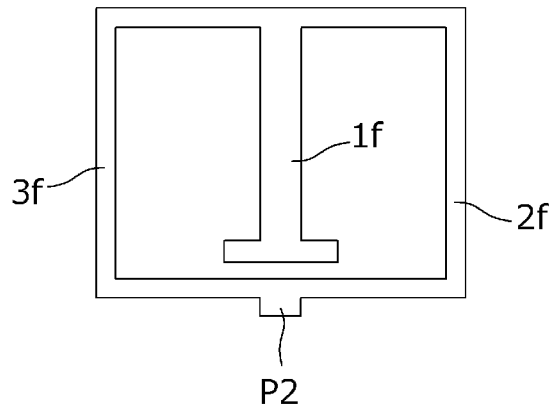
FOURTH LAYER (BOTTOM LAYER)
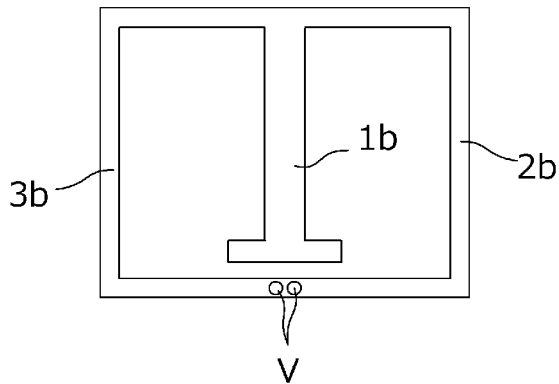
SECOND LAYER
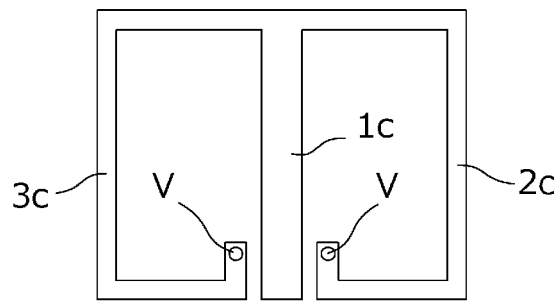
THIRD LAYER FIG. 12
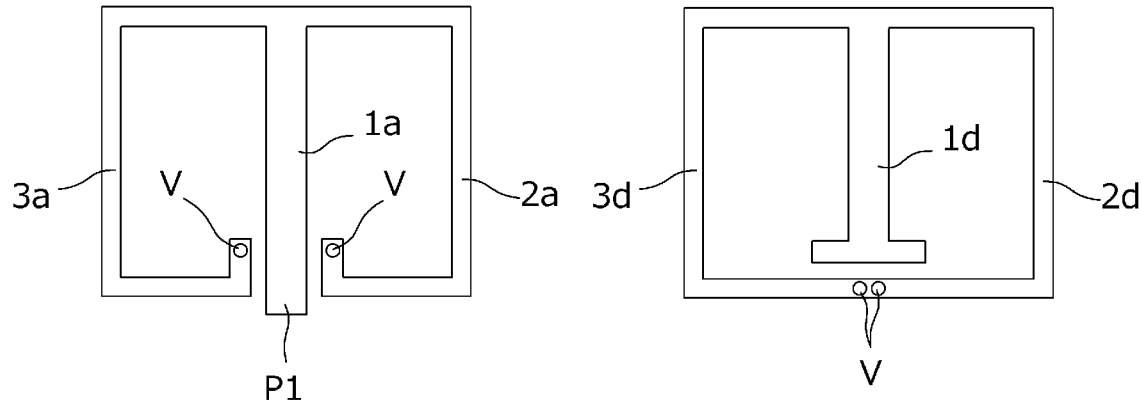
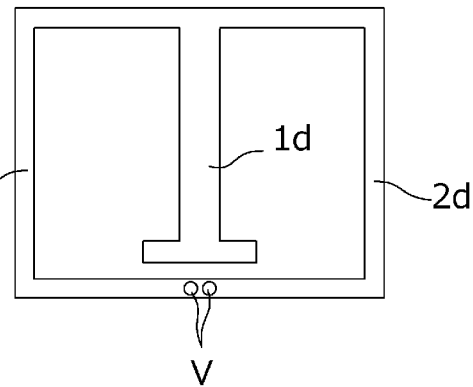
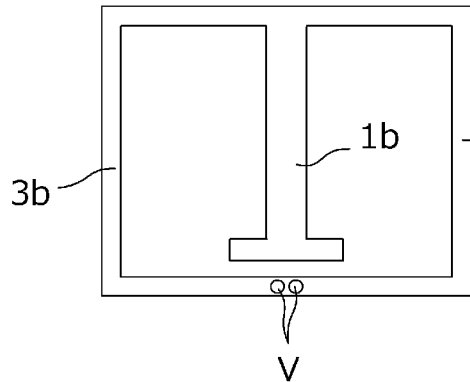
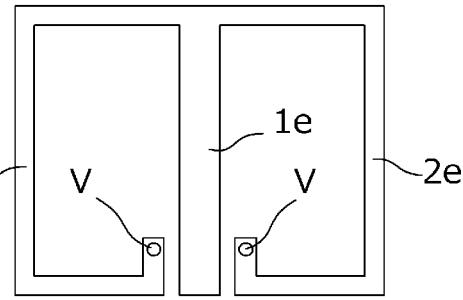
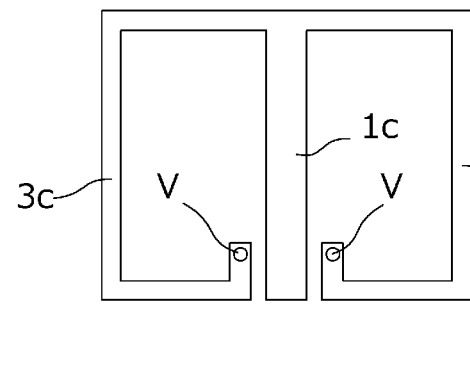
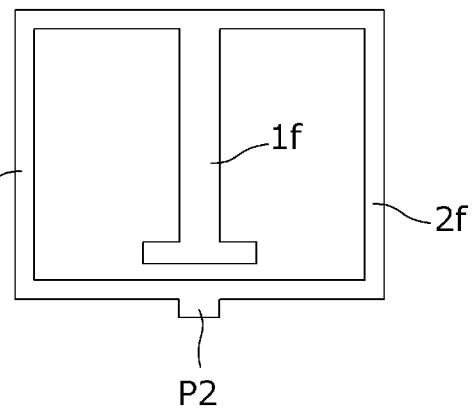

FIG. 13
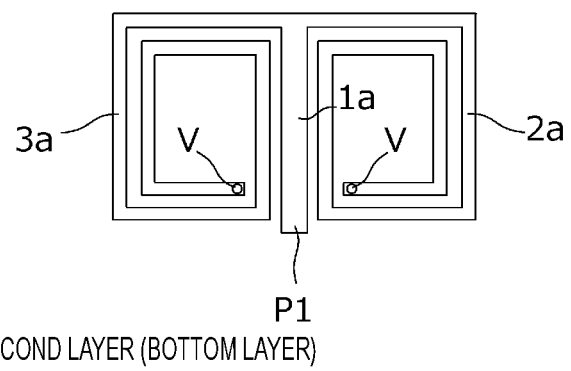
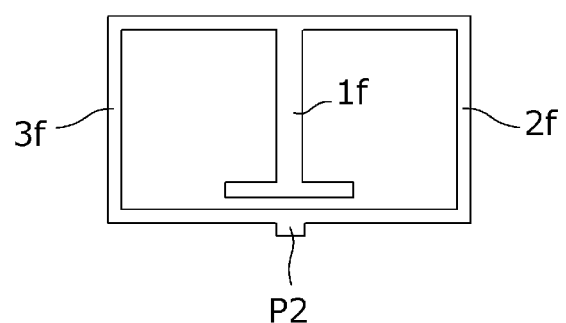

PLANAR ARRAY COIL AND SWITCHING POWER SUPPLY DEVICE

CROSS-REFERENCE TO RELATED APPLICATIONS

This application claims benefit of priority to International Patent Application No. PCT/JP2019/007492, filed Feb. 27, 2019, and to Japanese Patent Application No. 2018-153374, filed Aug. 17, 2018, the entire contents of each are incorporated herein by reference.

BACKGROUND

Technical Field

The present disclosure relates to a planar array coil including a plurality of coils arranged on a plane and a switching power supply device including the planar array coil.

Background Art

Lamination-type inductor arrays including a plurality of stacked coils have been known, as described, for example, in Japanese Unexamined Patent Application Publication No. 2015-73052. Japanese Unexamined Patent Application Publication No. 2015-73052 discloses an inductor array including a multilayer body in which a plurality of insulation layers and conductor patterns are laminated. The multilayer body includes a first coil and a second coil each including a plurality of conductor patterns, and the first coil and the second coil are stacked in two tiers.

SUMMARY

In the case where a plurality of helical inductors are stacked such that winding shafts of the inductors are coincident with each other, as with the inductor array described in Japanese Unexamined Patent Application Publication No. 2015-73052, unwanted magnetic coupling between the inductors easily occurs. Thus, in a switching power supply device that includes DC-DC converter circuits including inductors, such unwanted magnetic coupling may cause adverse effects on power conversion operation of each of the converter circuits. That is, failure occurs in power conversion operation of each of the converter circuits that should operate independently. In such situations, power conversion operation is not performed properly, and power conversion efficiency of the switching power supply device may degrade.

Thus, the present disclosure provides a planar array coil in which unwanted magnetic coupling between adjacent coils is reduced and a switching power supply device that includes the planar array coil and performs stable power conversion operation.

An array coil as an example of the present disclosure includes a multilayer substrate at which a plurality of coils are formed. Each of the plurality of coils has conductor patterns formed at the multilayer substrate and is arranged on a plane of the multilayer substrate. Each of the plurality of coils includes two coil parts in which currents flow in opposite rotation directions. The plurality of coils are arranged such that one coil part of one of the coils is adjacent to one coil part of another of the coils.

With the array coil described above, there is little chance of occurrence of unwanted magnetic coupling in regions of the adjacent coil parts of adjacent coils, of the plurality of coils arranged on the plane of the multilayer substrate, that extend in parallel. Thus, unwanted magnetic coupling between coils can be reduced. In accordance with this, the distance between the coils can be reduced, and the size of the array coil can be reduced.

Furthermore, a switching power supply device as an example of the present disclosure includes the planar array coil described above and a power conversion circuit. First ends of the plurality of coils are connected to switching circuit units of the power conversion circuit, and second ends of the plurality of coils are connected to a common output part. When the switching circuit units cause current to flow to the plurality of coils in multiple phases, currents in regions of the adjacent coil parts that extend in parallel to each other flow in a same direction.

With the switching power supply device described above, there is little chance of occurrence of unwanted magnetic coupling between coils. Thus, stable power conversion operation can be performed.

According to the present disclosure, a planar array coil in which unwanted magnetic coupling between adjacent coils is reduced and a switching power supply device that includes the planar array coil and performs stable power conversion operation can be obtained.

BRIEF DESCRIPTION OF THE DRAWINGS

FIG. 2 is an exploded plan view illustrating a structure of a coil of the planar array coil according to the first embodiment;

FIG. 10 is an exploded plan view illustrating a structure of a coil of a planar array coil according to a third embodiment;

FIG. 11 is an exploded plan view illustrating another structure of a coil of the planar array coil according to the third embodiment;

FIG. 12 is an exploded plan view illustrating still another structure of a coil of the planar array coil according to the third embodiment;

FIG. 13 is an exploded plan view illustrating a structure of a coil of a planar array coil according to a fourth embodiment;

DETAILED DESCRIPTION

First Embodiment

Figure 1:
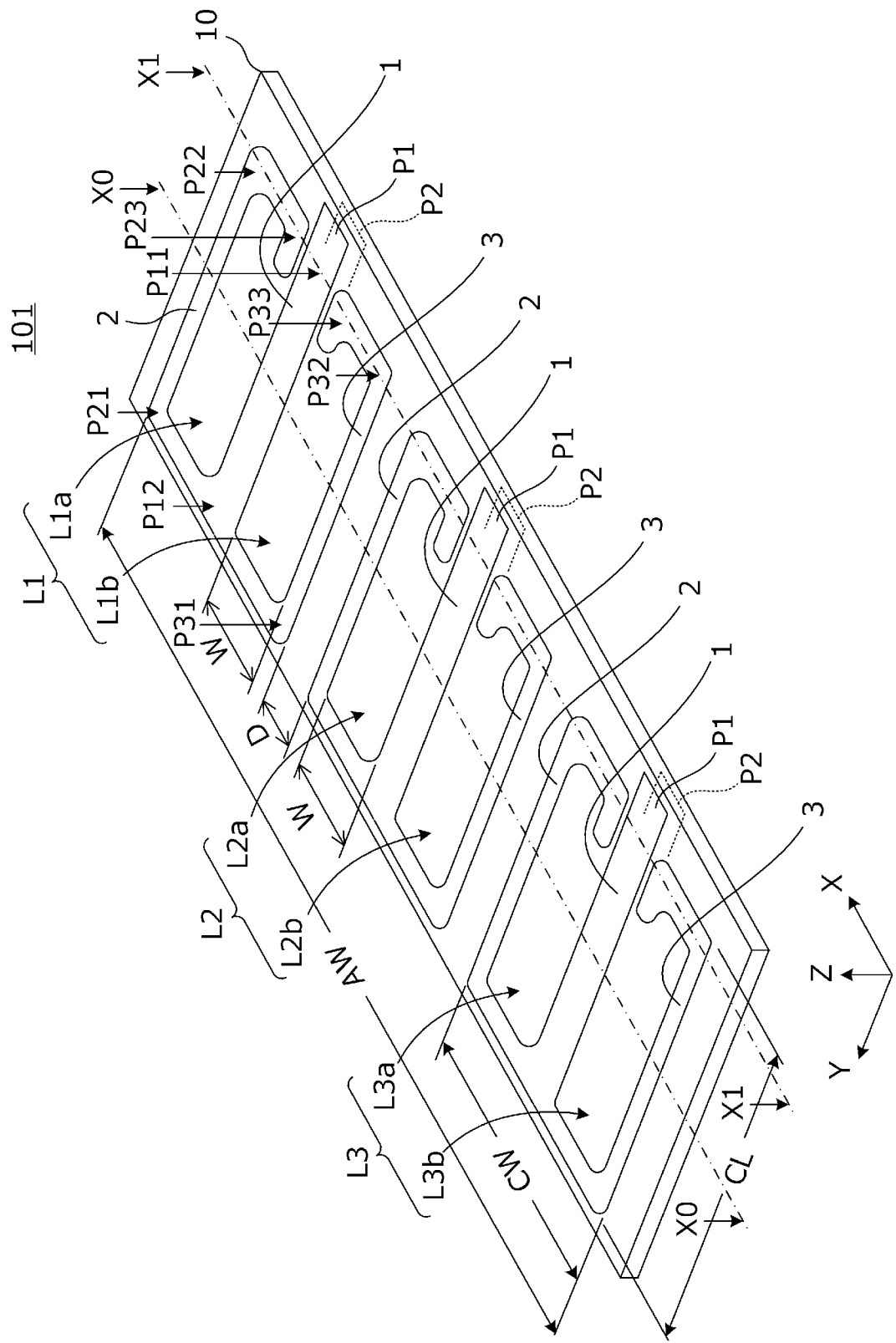
FIG. 1 is a perspective view of a planar array coil according to a first embodiment.
Figure 3:
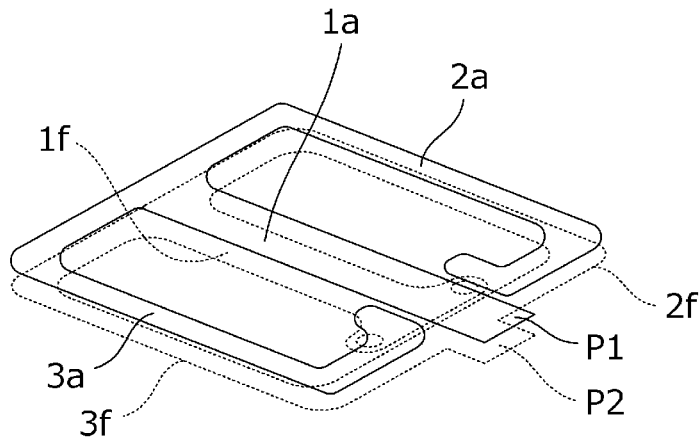
FIG. 3 is a perspective view simply illustrating a state in which conductor patterns at individual layers illustrated in FIG. 2 are laminated.
Figure 4A:
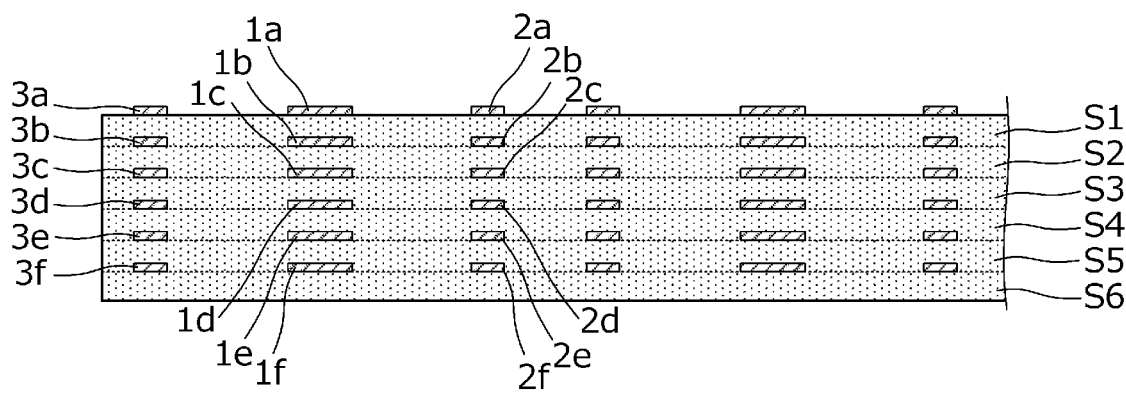
FIG. 4A is a longitudinal cross-section view of a part X0-X0 in FIG. 1.
Figure 4B:
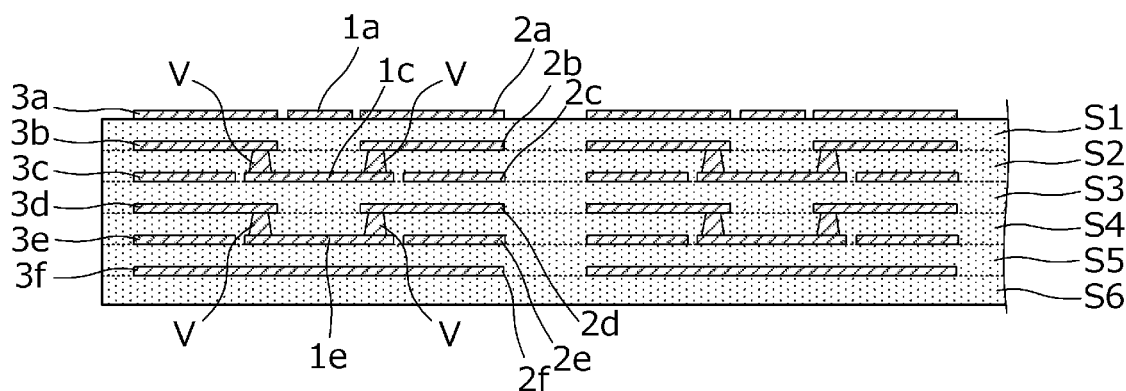
FIG. 4B is a longitudinal cross-section view of a part X1-X1 in FIG. 1.
Figure 5A:
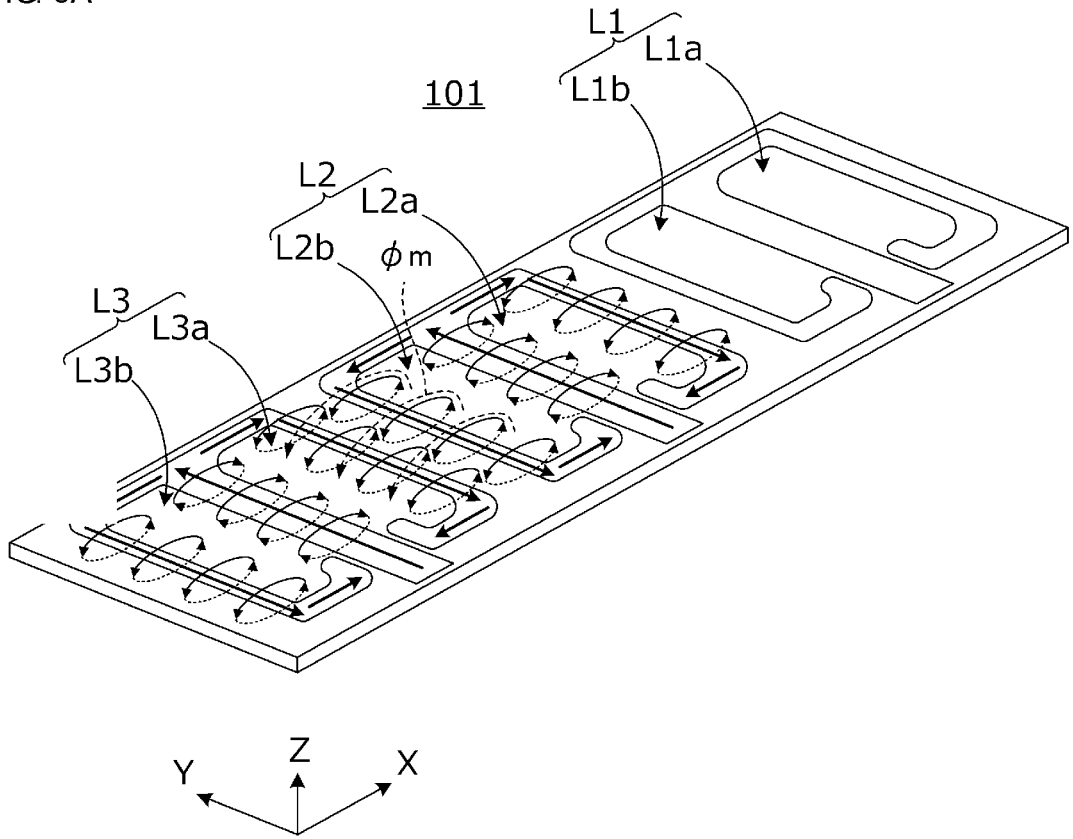
FIG. 5A is a perspective view illustrating a state of current flowing in the planar array coil and generated magnetic flux.
Figure 5B:
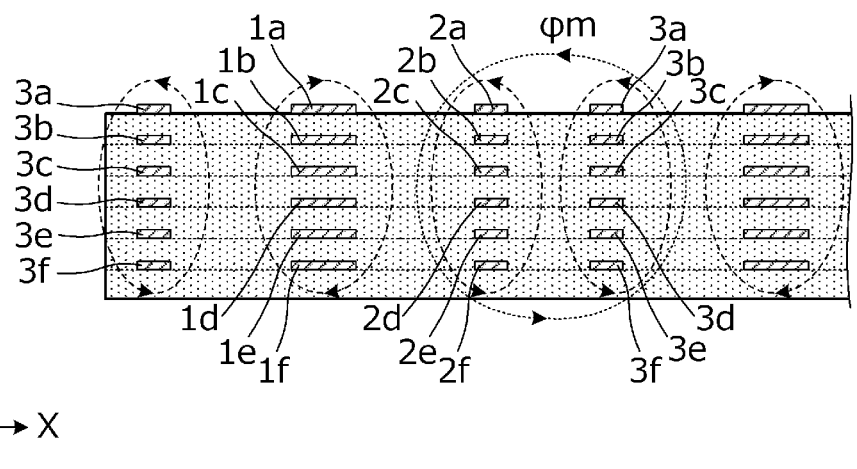
FIG. 5B is a cross-section view of the state illustrated in FIG. 5A.

FIG. 1 is a perspective view of a planar array coil 101 according to a first embodiment. FIG. 2 is an exploded plan view illustrating a structure of a coil of the planar array coil 101 according to this embodiment. FIG. 3 is a perspective view simply illustrating a state in which conductor patterns at individual layers illustrated in FIG. 2 are laminated. FIG. 4A is a longitudinal cross-section view of a part X0-X0 in FIG. 1, and FIG. 4B is a longitudinal cross-section view of a part X1-X1 in FIG. 1. FIG. 5A is a perspective view illustrating current flowing in the planar array coil 101 and generated magnetic flux, and FIG. 5B is a cross-section view of the state illustrated in FIG. 5A.

The planar array coil 101 according to this embodiment includes a plurality of coils L1, L2, and L3 formed at a multilayer substrate 10. First ends P1 of the coils L1, L2, and L3 are connected to switching circuit units of a power conversion circuit, and second ends P2 of the coils L1, L2, and L3 are connected to a common output part. The detailed structure of the individual coils and the power conversion circuit will be described later.

The multilayer substrate 10 has a flat plate shape in which an X direction is represented by a longer direction and a Y direction is represented by a shorter direction. The plurality of coils L1, L2, and L3 are arranged along the longer direction of the multilayer substrate 10. The coils L1, L2, and L3 have conductor patterns formed at the multilayer substrate 10.

The coil L1 includes coil parts L1a and L1b, the coil L2 includes coil parts L2a and L2b, and the coil L3 includes coil parts L3a and L3b. The coil part L1a includes a central conductor pattern 1 and a coil-shaped conductor pattern 2 of the coil L1, and the coil part L1b includes the central conductor pattern 1 and a coil-shaped conductor pattern 3 of the coil L1. In a similar manner, the coil part L2a includes the central conductor pattern 1 and the coil-shaped conductor pattern 2 of the coil L2, and the coil part L2b includes the central conductor pattern 1 and the coil-shaped conductor pattern 3 of the coil L2. Furthermore, the coil part L3a includes the central conductor pattern 1 and the coil-shaped conductor pattern 2 of the coil L3, and the coil part L3b includes the central conductor pattern 1 and the coil-shaped conductor pattern 3 of the coil L3.

Specifically, taking the coil L1 as an example, the central conductor pattern 1 has a conductor pattern extending from one end or a part P11 near the one end in the shorter direction of the multilayer substrate 10 toward the other end P12. Furthermore, the coil-shaped conductor pattern 2 has a conductor pattern including a first connection part extending from the other end P12 of the central conductor pattern 1 to a bending point P21 in the longer direction of the multilayer substrate 10, a second connection part extending from the bending point P21 to a bending point P22 in the shorter direction of the multilayer substrate 10, and a third connection part extending from the bending point P22 to a bending point P23 in the longer direction of the multilayer substrate 10. In a similar manner, the coil-shaped conductor pattern 3 has a conductor pattern including a first connection part extending from the other end P12 of the central conductor pattern 1 to a bending point P31 in the longer direction of the multilayer substrate 10, a second connection part extending from the bending point P31 to a bending point P32 in the shorter direction of the multilayer substrate 10, and a third connection part extending from the bending point P32 to a bending point P33 in the longer direction of the multilayer substrate 10.

With the structure described above, the coil-shaped conductor patterns 2 and 3 are each configured as a ring-shaped conductor pattern with less than one turn. The central conductor pattern 1 and the second connection part (between the points P21 and P22) of the coil-shaped conductor pattern 2 are arranged in parallel, and the central conductor pattern 1 and the second connection part (between the points P31 and P32) of the coil-shaped conductor pattern 3 are arranged in parallel.

The first ends P1 and the second ends P2 of the coils L1, L2, and L3 are drawn toward one end portions in the shorter direction of the multilayer substrate 10 and arranged along the longer direction of the multilayer substrate 10. Furthermore, the first ends P1 and the second ends P2 are arranged to face each other in the thickness direction of the multilayer substrate 10, that is, arranged to overlap when viewed in plan.

The example illustrated in FIG. 2 represents a case where a multilayer substrate (multilayer substrate 10 illustrated in FIG. 1) is manufactured using a build-up method to form the planar array coil 101. In FIG. 2, only coil conductor patterns formed at individual layers of the multilayer substrate 10 are illustrated. The coils L1, L2, and L3 in FIG. 1 have the same configuration.

As illustrated in FIGS. 2, 4A, and 4B, a central conductor pattern 1a and two coil-shaped conductor patterns 2a and 3a are formed at a first layer S1, which is a front layer. In a similar manner, a central conductor pattern 1*b* and two coil-shaped conductor patterns 2*b* and 3*b* are formed at a second layer S2, a central conductor pattern 1*c* and two coil-shaped conductor patterns 2*c* and 3*c* are formed at a third layer S3, a central conductor pattern 1*d* and two coil-shaped conductor patterns 2*d* and 3*d* are formed at a fourth layer S4, and a central conductor pattern 1*e* and two coil-shaped conductor patterns 2*e* and 3*e* are formed at a fifth layer S5. Furthermore, a central conductor pattern 1*f* and two coil-shaped conductor patterns 2*f* and 3*f* are formed at a sixth layer S6, which is a bottom layer. The central conductor patterns 1*a* to 1*f* each have a linear shape (segment line shape), and the coil-shaped conductor patterns 2*a* to 2*f* and 3*a* to 3*f* are each a conductor pattern with less than one turn.

End portions of the coil-shaped conductor patterns 2*a* and 3*a* at the first layer S1 and end portions of the central conductor pattern 1*b* at the second layer S2 are connected through vias V in the first layer S1. Furthermore, end portions of the coil-shaped conductor patterns 2*b* and 3*b* at the second layer S2 and end portions of the central conductor pattern 1*c* at the third layer S3 are connected through vias V in the second layer S2. In a similar manner, end portions of the coil-shaped conductor patterns 2*c* and 3*c* at the third layer S3 and end portions of the central conductor pattern 1*d* at the fourth layer S4 are connected through vias V in the third layer S3, and end portions of the coil-shaped conductor patterns 2*d* and 3*d* at the fourth layer S4 and end portions of the central conductor pattern 1*e* at the fifth layer S5 are connected through vias V in the fourth layer S4. Furthermore, end portions of the coil-shaped conductor patterns 2*e* and 3*e* at the fifth layer S5 and end portions of the central conductor pattern 1*f* at the sixth layer S6 are connected through vias V in the fifth layer S5.

Of a plurality of base material layers at which coil conductor patterns are formed, coil conductor patterns at intermedial layers (second layer S2 to fifth layer S5) that are sandwiched between the bottom layer and the front layer include coil conductor patterns of two types, and the coil conductor patterns of two types are arranged alternately in a lamination direction of the multilayer substrate. In the example illustrated in FIGS. 2, 4A, and 4B, the coil conductor patterns of the first type are formed at the second layer S2 and the fourth layer S4, and the coil conductor patterns of the second type are formed at the third layer S3 and the fifth layer S5.

An end portion of the central conductor pattern 1*a* at the first layer S1 is drawn as the first end P1, and end portions of the coil-shaped conductor patterns 2*f* and 3*f* at the sixth layer S6 are connected and drawn as the second end P2.

As illustrated in FIGS. 3, 4A, and 4B, most parts of the central conductor patterns 1*a* to 1*f* at the individual layers overlap when viewed in plan. Furthermore, most parts of the coil-shaped conductor patterns 2*a* to 2*f* at the individual layers overlap when viewed in plan, and most parts of the coil-shaped conductor patterns 3*a* to 3*f* at the individual layer overlap when viewed in plan. Furthermore, in this example, as described above, the first end P1 and the second end P2 overlap when viewed in plan.

In the example illustrated in FIGS. 1, 2, and so on, coils having ring-shaped conductor patterns each with a rounded rectangular shape as its rough outline shape are illustrated. However, the rough outline shape may be a rectangular shape, an oval shape, an ellipse shape, a circular shape, or the like.

The coil has the conductor patterns illustrated in FIGS. 2 and 3. Thus, when voltage is applied between the first end P1 and the second end P2, current flows in directions illustrated in FIGS. 5A and 5B, and magnetic flux is generated.

A straight-line arrows in FIG. 5A represent directions of current flowing in coil parts at certain phases (timings). Broken-line loops in FIG. 5B represent magnetic flux generated in coil parts at certain phases (timings). FIG. 5B is obtained by adding magnetic flux to FIG. 4A. That is, currents in the two coil parts L1*a* and L1*b* of the coil L1 flow in opposite rotation directions. In a similar manner, currents in the two coil parts L2*a* and L2*b* of the coil L2 flow in opposite rotation directions, and currents in the two coil parts L3*a* and L3*b* of the coil L3 flow in opposite rotation directions.

Furthermore, the coils L1, L2, and L3 are arranged such that one coil part of one of the coils is adjacent to one coil part of another one of the coils. Specifically, the coil part L1*b* of the coil L1 and the coil part L2*a* of the coil L2 are adjacent to each other, and the coil part L2*b* of the coil L2 and the coil part L3*a* of the coil L3 are adjacent to each other.

The coils L1, L2, and L3 are connected such that operation of switching circuits causes currents in regions of adjacent coil parts that extend in parallel to each other to flow in the same direction. In the example illustrated using arrows in FIG. 5A, currents in regions of adjacent coil parts that extend in parallel to each other in a Y-axis direction flow in the same direction.

Figure 6:
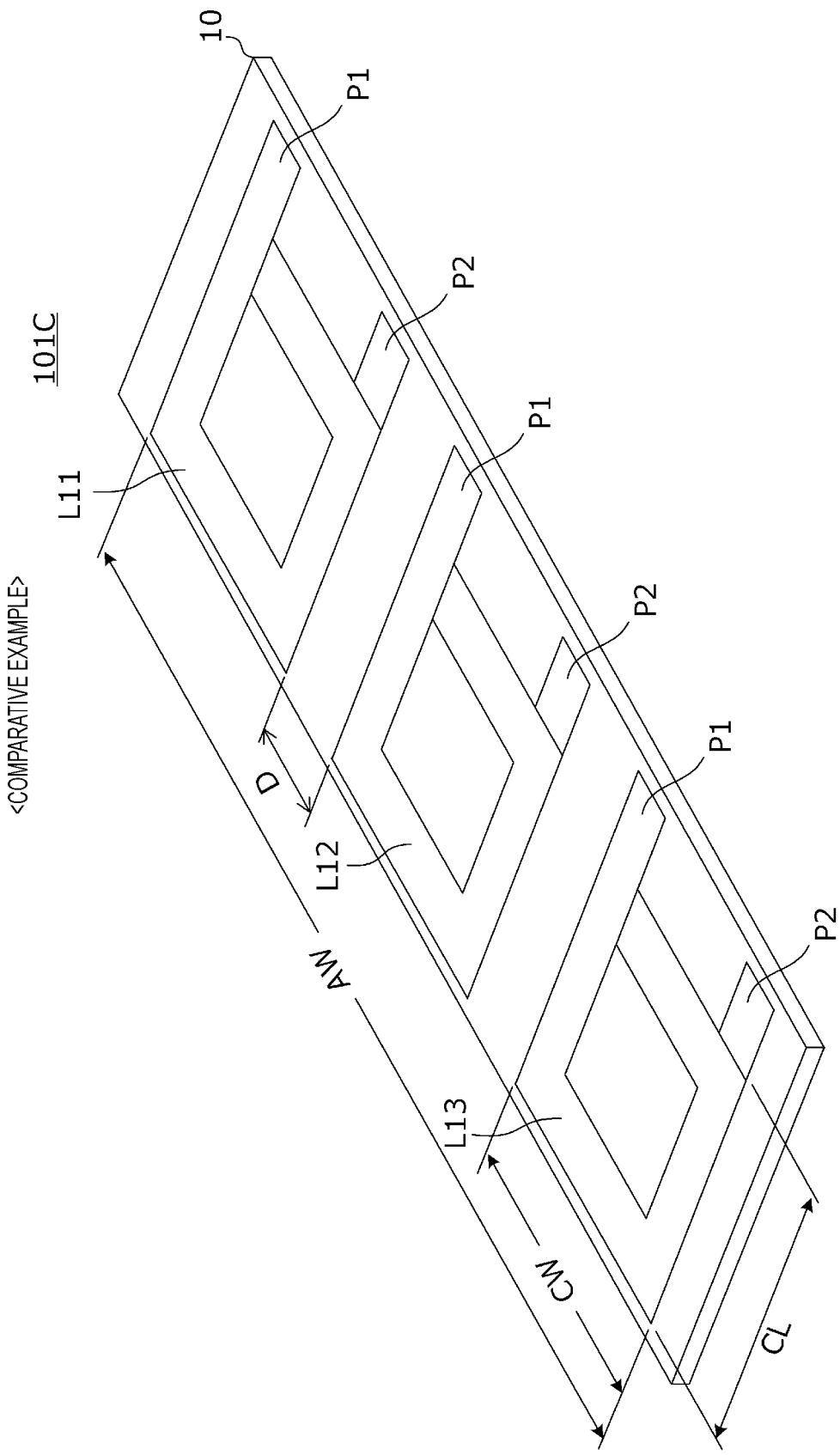
FIG. 6 is a perspective view of a planar array coil according to a comparative example.
Figure 7A:
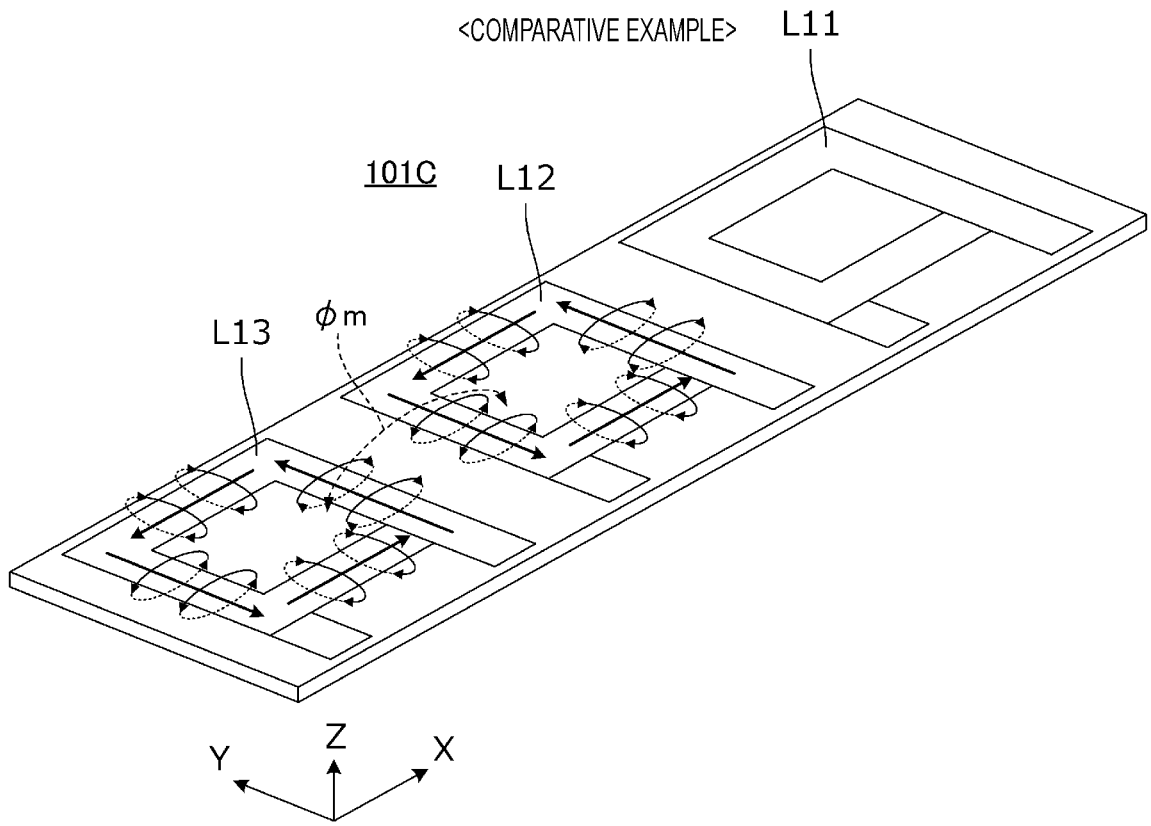
FIG. 7A is a perspective view illustrating a state of current flowing in the planar array coil and generated magnetic flux.
Figure 7B:
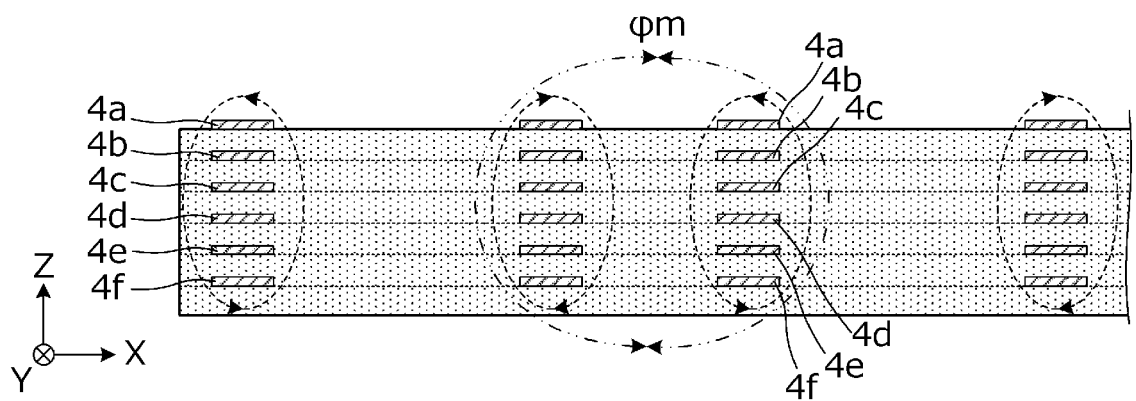
FIG. 7B is a cross-section view of the state illustrated in FIG. 7A.

FIG. 6 is a perspective view of a planar array coil 101C according to a comparative example. FIG. 7A is a perspective view illustrating a state of current flowing in the planar array coil 101C and generated magnetic flux, and FIG. 7B is a cross-section view of the state illustrated in FIG. 7A.

The planar array coil 101C according to the comparative example illustrated in FIGS. 6 and 7A includes a plurality of coils L11, L12, and L13 formed at the multilayer substrate 10. The first ends P1 of the coils L11, L12, and L13 are connected to switching circuit units of a power conversion circuit, and the second ends P2 of the coils L11, L12, and L13 are connected to a common output part. The coils L11, L12, and L13 have conductor patterns 4*a* to 4*f* formed at the multilayer substrate 10 and are arranged along a plane of the multilayer substrate 10. The coils L11, L12, and L13 each have a coil opening.

In accordance with operation of the switching circuits, currents rotating in the same direction flow in the coils L11, L12, and L13. Thus, currents in regions of adjacent coils that extend in parallel to each other flow in opposite directions.

In the planar array coil 101C according to the comparative example illustrated in FIG. 7A, when magnetic flux φm interlinked with adjacent coils is generated, currents flowing in the adjacent two coils are canceled out by the magnetic flux φm. That is, unwanted coupling between the adjacent two coils via a magnetic field occurs. In order to reduce such unwanted coupling, the distance between the adjacent coils needs to be increased, and a reduction in size is not possible.

In contrast, in the planar array coil 101 according to this embodiment illustrated in FIGS. 1 and 5A, even if the magnetic flux φm interlinked with adjacent coil parts is generated, currents flowing in the adjacent coil parts are not canceled out by the magnetic flux φm. That is, magnetic coupling between the adjacent coil parts via magnetic flux does not produce adverse effect. Thus, the distance between the adjacent coils can be reduced, and this arrangement can reduce the size of an array coil. In the example illustrated in FIG. 1, the distance D between the adjacent coil parts of adjacent coils L1, L2, and L3 is smaller than the opening width W of the coil parts in the direction of the distance D. The "distance D" represents the distance between adjacent coil parts of adjacent coils in the direction in which the coils are adjacent to each other (in the example illustrated in FIG. 1, the longer direction of the multilayer substrate 10). For example, the distance D represents the distance between the coil part L1b of the coil L1 and the coil part L2a of the coil L2. Furthermore, the "opening width W" represents the opening width of adjacent coil parts of adjacent coils in the direction in which the coils are adjacent to each other (in the example illustrated in FIG. 1, the longer direction of the multilayer substrate 10). In the case where coil opening width of coil parts in the direction in which the coils are adjacent to each other varies depending on the position in the direction in which the central conductor pattern 1 extends, that is, in the case where the coil opening width is not constant, the maximum coil opening width is defined as a representative value of the coil opening width W.

In the example illustrated in FIG. 1, the distance from an edge of one conductor pattern to an edge of another conductor pattern is defined as the "distance D" or the "opening width W". However, the distance from the center of the line width of one conductor pattern to the center of the line width of another conductor pattern may be defined as the "distance D" or the "opening width W".

With the structure described above, coil-shaped conductor patterns of adjacent coils are arranged in adjacent to each other. Thus, no conductor is provided between the adjacent coil-shaped conductor patterns, and the adjacent coil-shaped conductor patterns are arranged to face each other with a dielectric interposed therebetween in a plane direction.

Examples of dimensions of the individual parts illustrated in FIGS. 1 and 6 are described below.

Width AW of all coils: 34 mm
Width CW of coil: 10 mm
Length CL of coil part: 10 mm
Opening width W: 3.3 mm
Distance D between coil parts: 2 mm
Line width of central conductor pattern 1: 1.8 mm
Line width of coil-shaped conductor patterns 2 and 3: 0.8 mm As described above, in this embodiment, the length (length CL of a coil part) in the direction in which the central conductor pattern 1 extends is greater than the opening width W of the coil part. Furthermore, a current flowing in the central conductor pattern 1 is equal to the sum of current flowing in the coil-shaped conductor pattern 2 and current flowing in the coil-shaped conductor pattern 3, that is, a current that is twice the current flowing in the coil-shaped conductor pattern 2 flows in the central conductor pattern 1. Thus, the current density of the central conductor pattern 1 is set to be equal to or substantially equal to the current density of the coil-shaped conductor patterns 2 and 3. In the case where thicknesses of individual conductor patterns are the same, the line width of the central conductor pattern 1 is approximately twice the line width of the coil-shaped conductor patterns 2 and 3. With the structure that causes current flowing in the central conductor pattern 1 to branch out equally to the coil-shaped conductor pattern 2 and the coil-shaped conductor pattern 3, impedances of conductor patterns in individual parts are uniform, the entire impedance decreases, and the area of the coil can be minimized That is, the trade-off relationship between the impedance of the conductor patterns and the area of the coil can be optimized, and a high-efficiency, compact, and light coil can be configured.

Figure 8:
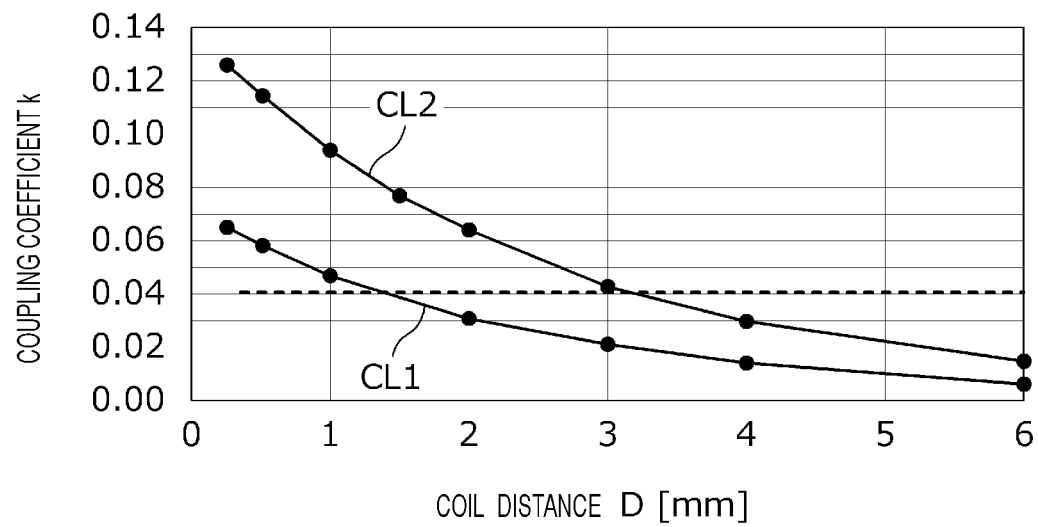
FIG. 8 is a diagram illustrating the relationship between a magnetic coupling coefficient and a distance between adjacent coils.

FIG. 8 is a diagram illustrating the relationship between a magnetic coupling coefficient k and the distance D between adjacent coils. In FIG. 8, a characteristics line CL1 represents characteristics of the planar array coil 101 according to this embodiment, and a characteristics line CL2 represents characteristics of the planar array coil 101C according to the comparative example. As described above, according to a comparison regarding the distance D between corresponding coils, the magnetic coupling coefficient k for the planar array coil 101 according to this embodiment is smaller than the magnetic coupling coefficient k for the planar array coil 101C according to the comparative example.

For example, in the case where the maximum target value for the magnetic coupling coefficient k is set to 0.04, the distance D between coils in the planar array coil 101C needs to be 4 mm or more. On the other hand, the distance D between coils in the planar array coil 101 according to this embodiment can be reduced to 2 mm.

Second Embodiment

In a second embodiment, some coils having conductor patterns whose shapes are different from those in the first embodiment will be described.

Figure 9:
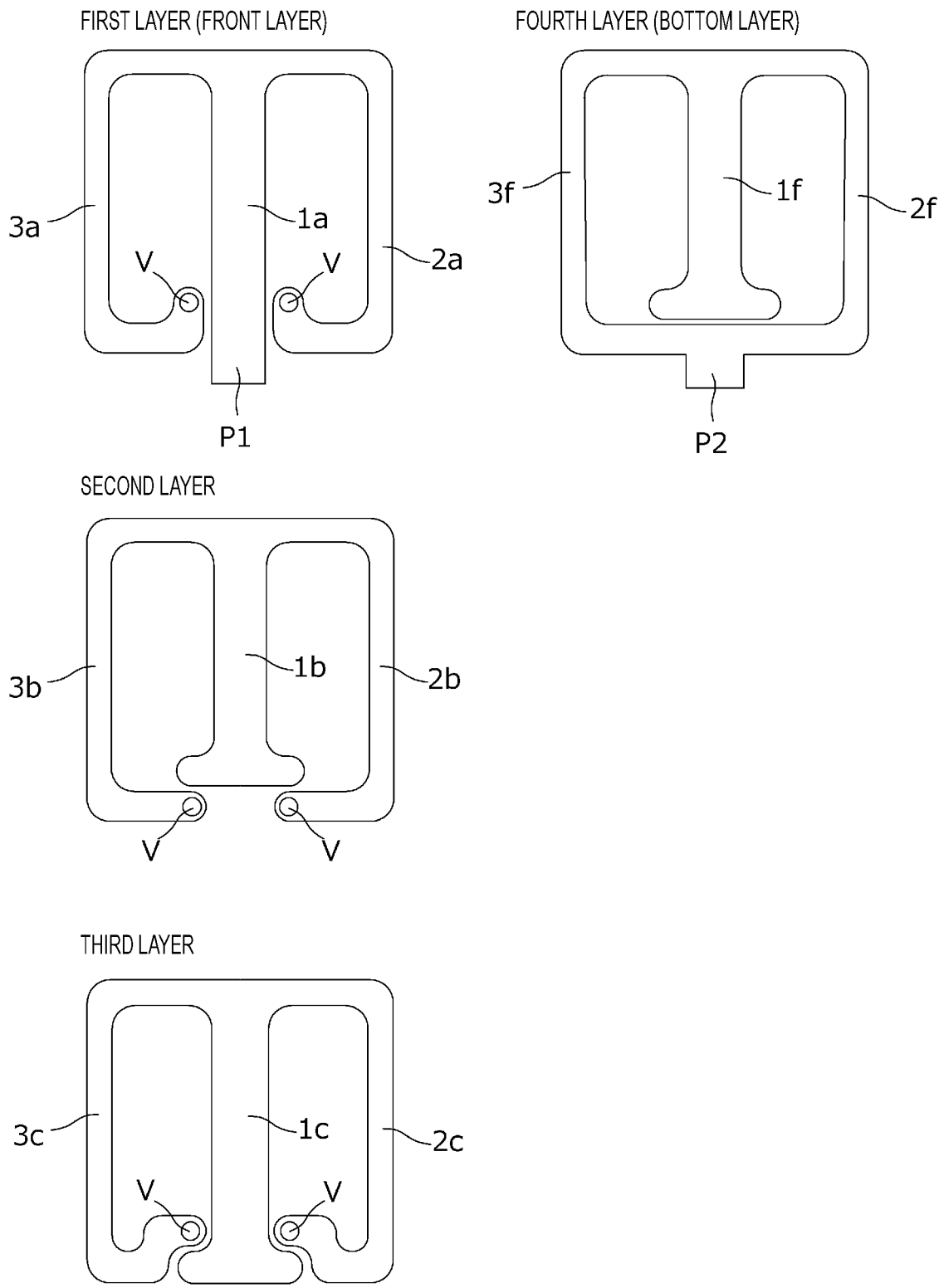
FIG. 9 is an exploded plan view illustrating a structure of a coil of a planar array coil according to a second embodiment.

FIG. 9 is an exploded plan view illustrating a structure of a coil of a planar array coil according to the second embodiment. As in the example illustrated in FIG. 2, only coil conductor patterns formed at individual layers of the multilayer substrate 10 are illustrated in FIG. 9. The coil illustrated in FIG. 9 does not include the fourth layer and the fifth layer illustrated in FIG. 2. That is, one of the coil conductor patterns of the first type formed at the second layer and the fourth layer illustrated in FIG. 2 and one of the coil conductor patterns of the second type formed at the third layer and the fifth layer illustrated in FIG. 2 are provided.

As described above, the number of laminated conductor patterns may be set in an appropriate manner.

In FIGS. 2 and 9, the second layer and the third layer form the minimum unit of a repetition period toward the lamination direction. In the case where the number of repetition times of the second and third layers is "0", a coil includes two layers, the front layer and the bottom layer. In the case where the number of repetition times of the second and third layers is "1", a coil includes four layers, as illustrated in FIG. 9. In the case where the number of repetition times of the second and third layers is "2", a coil includes six layers, as illustrated in FIG. 2. The number of repetition times of the second and third layers may be "3" or more.

Third Embodiment

In a third embodiment, some coils having conductor patterns whose shapes are different from those in the first embodiment and the second embodiment will be described.

FIGS. 10, 11, and 12 are exploded plan views illustrating a structure of a coil of a planar array coil according to the third embodiment. As in the examples illustrated in FIGS. 2 and 9, only coil conductor patterns formed at individual layers of a multilayer substrate are illustrated. Bending parts of conductor patterns configuring coils of the planar array coil according to this embodiment do not have a round shape but are bent at right angle, unlike the examples illustrated in FIGS. 2, 9, and so on.

A coil illustrated in FIG. 10 has a structure in which the second layer and the third layer illustrated in FIG. 9 are removed. That is, the coil has the coil conductor pattern formed at the first layer (front layer) and the coil conductor pattern formed at the second layer (bottom layer) in FIG. 9.

A coil illustrated in FIG. 11 is similar to the coil illustrated in FIG. 9. However, in the example illustrated in FIG. 11, the coil-shaped conductor pattern 2*b* and the coil-shaped conductor pattern 3*b* are connected in the coil conductor pattern at the second layer. In FIG. 11, vias V formed in the second layer are connected to end portions of the central conductor pattern 1*c* at the third layer.

A coil illustrated in FIG. 12 is similar to the coil illustrated in FIG. 2. However, in the example illustrated in FIG. 12, the coil-shaped conductor pattern 2*b* and the coil-shaped conductor pattern 3*b* are connected in the coil conductor pattern at the second layer. Furthermore, the coil-shaped conductor pattern 2*d* and the coil-shaped conductor pattern 3*d* are connected in the coil conductor pattern at the fourth layer.

Fourth Embodiment

In a fourth embodiment, some coils having conductor patterns whose shapes are different from those in the foregoing embodiments will be described.

Figure 14:
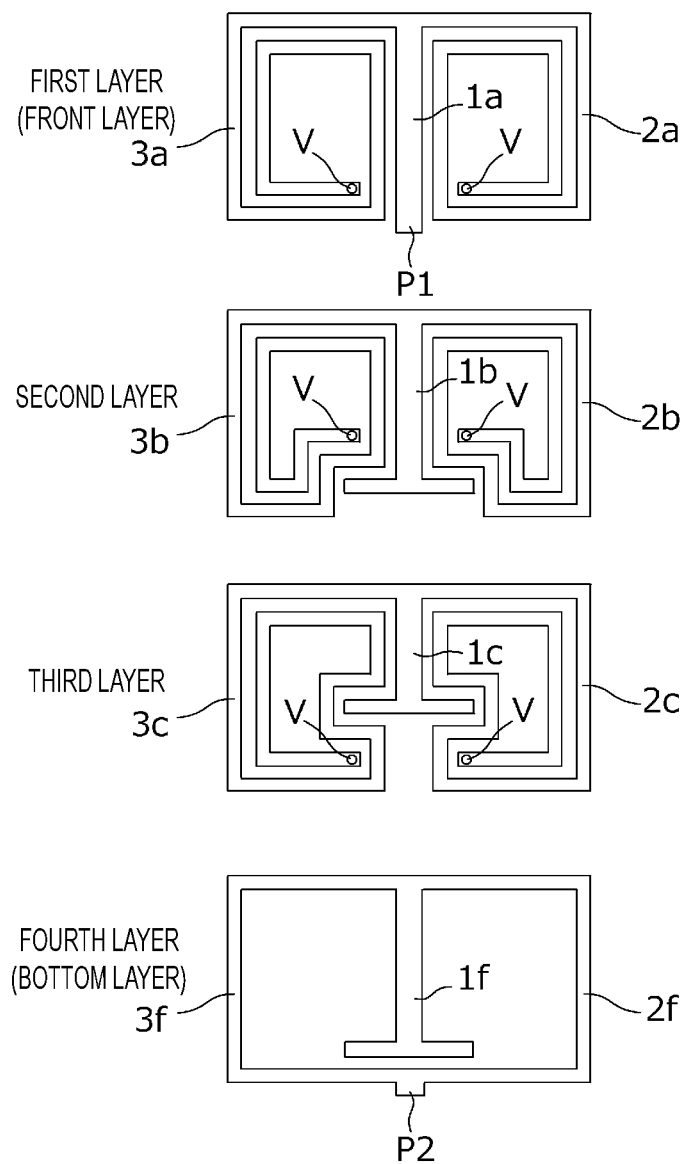
FIG. 14 is an exploded plan view illustrating another structure of a coil of the planar array coil according to the fourth embodiment.
Figure 15:
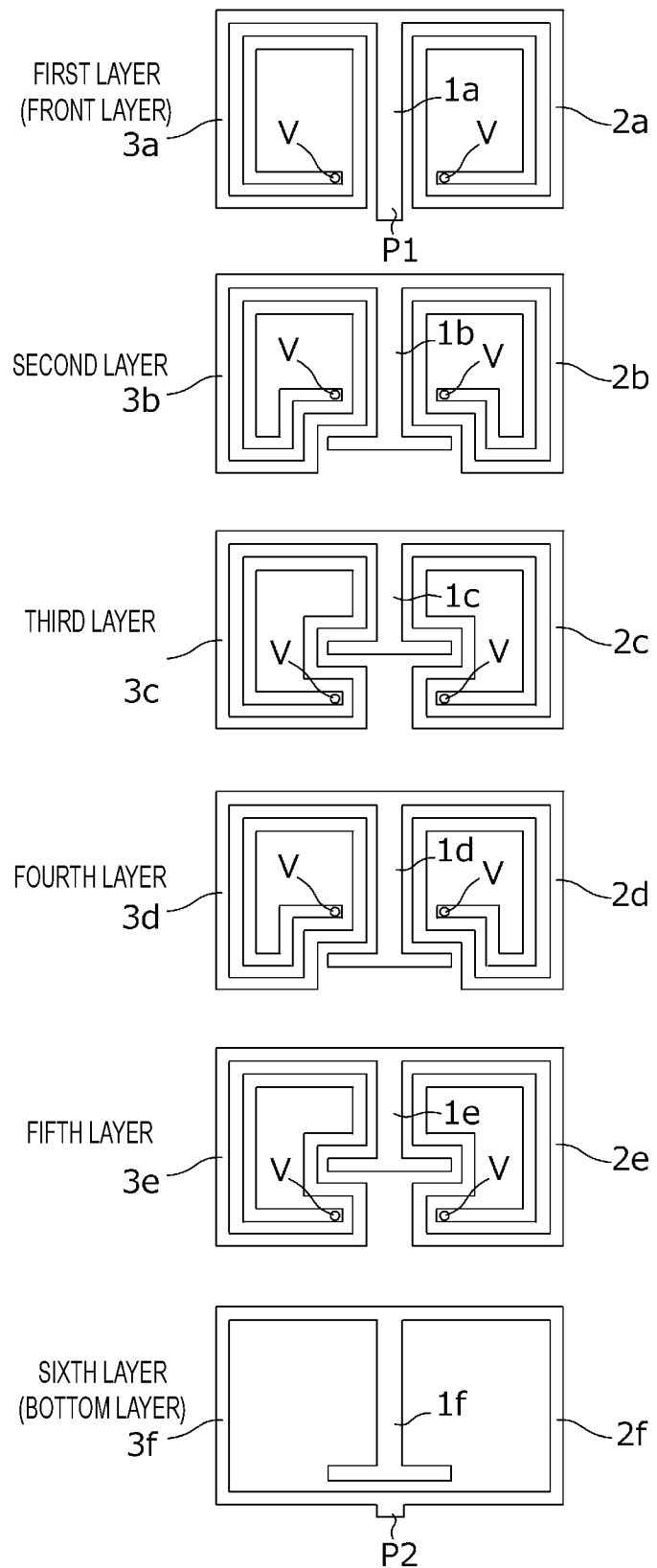
FIG. 15 is an exploded plan view illustrating still another structure of a coil of the planar array coil according to the fourth embodiment.

FIGS. 13, 14, and 15 are exploded plan views illustrating a structure of a coil of a planar array coil according to the fourth embodiment. As in the examples illustrated in FIG. 2 and so on, only coil conductor patterns formed at individual layers of a multilayer substrate are illustrated.

In a coil illustrated in FIG. 13, a central conductor pattern 1*a* and two coil-shaped conductor patterns 2*a* and 3*a* are formed at a first layer, which is a front layer, and a central conductor pattern 1*f* and two coil-shaped conductor patterns 2*f* and 3*f* are formed at a second layer. End portions of the coil-shaped conductor patterns 2*a* and 3*a* at the first layer and end portions of the central conductor pattern 1*f* at the second layer are connected through vias V.

In a coil illustrated in FIG. 14, a central conductor pattern 1*a* and two coil-shaped conductor patterns 2*a* and 3*a* are formed at a first layer, which is a front layer, and a central conductor pattern 1*b* and two coil-shaped conductor patterns 2*b* and 3*b* are formed at a second layer. A central conductor pattern 1*c* and two coil-shaped conductor patterns 2*c* and 3*c* are formed at a third layer, and a central conductor pattern 1*f* and two coil-shaped conductor patterns 2*f* and 3*f* are formed at a fourth layer, which is a bottom layer. Conductor patterns that are adjacent to each other in the lamination direction are connected through vias V.

A coil illustrated in FIG. 15 has conductor patterns stretching over six layers. The configuration of the region from first to third layers is the same as the configuration of the region of the coil from first to third layers in FIG. 14. A central conductor pattern 1*d* and two coil-shaped conductor patterns 2*d* and 3*d* are formed at a fourth layer, and a central conductor pattern 1*e* and two coil-shaped conductor patterns 2*e* and 3*e* are formed at a fifth layer. A central conductor pattern 1*f* and two coil-shaped conductor patterns 2*f* and 3*f* are formed at a sixth layer, which is a bottom layer. Conductor patterns that are adjacent to each other in the lamination direction are connected through vias V.

In FIG. 15, the conductor pattern at the fourth layer is the same as the conductor pattern at the second layer, and the conductor pattern at the third layer is the same as the conductor pattern at the fifth layer. In other words, the coil illustrated in FIG. 14 is a coil configured such that the number of repetition times of a set of the coil conductor pattern of the first type formed at the second layer and the coil conductor pattern of the second type formed at the third layer is one, and the coil illustrated in FIG. 15 is a coil configured such that the number of repetition times of the set of the coil conductor pattern of the first type and the coil conductor pattern of the second type is two. The coil illustrated in FIG. 13 is a coil configured such that the number of repetition times is 0.

With the structure described above, the coil-shaped conductor patterns 2 and 3 are spiral-shaped conductor patterns each having one or more turns. As described above, conductor patterns with one or more turns may be provided.

In the examples illustrated in FIGS. 13 to 15, examples of a coil having a spiral-shaped conductor pattern whose rough outline shape is rectangular and a ring-shaped conductor pattern whose rough outline shape is rectangular are illustrated. However, the rough outline shape may be a round rectangular shape, an oval shape, an ellipse shape, a circular shape, or the like.

Fifth Embodiment

Figure 16:
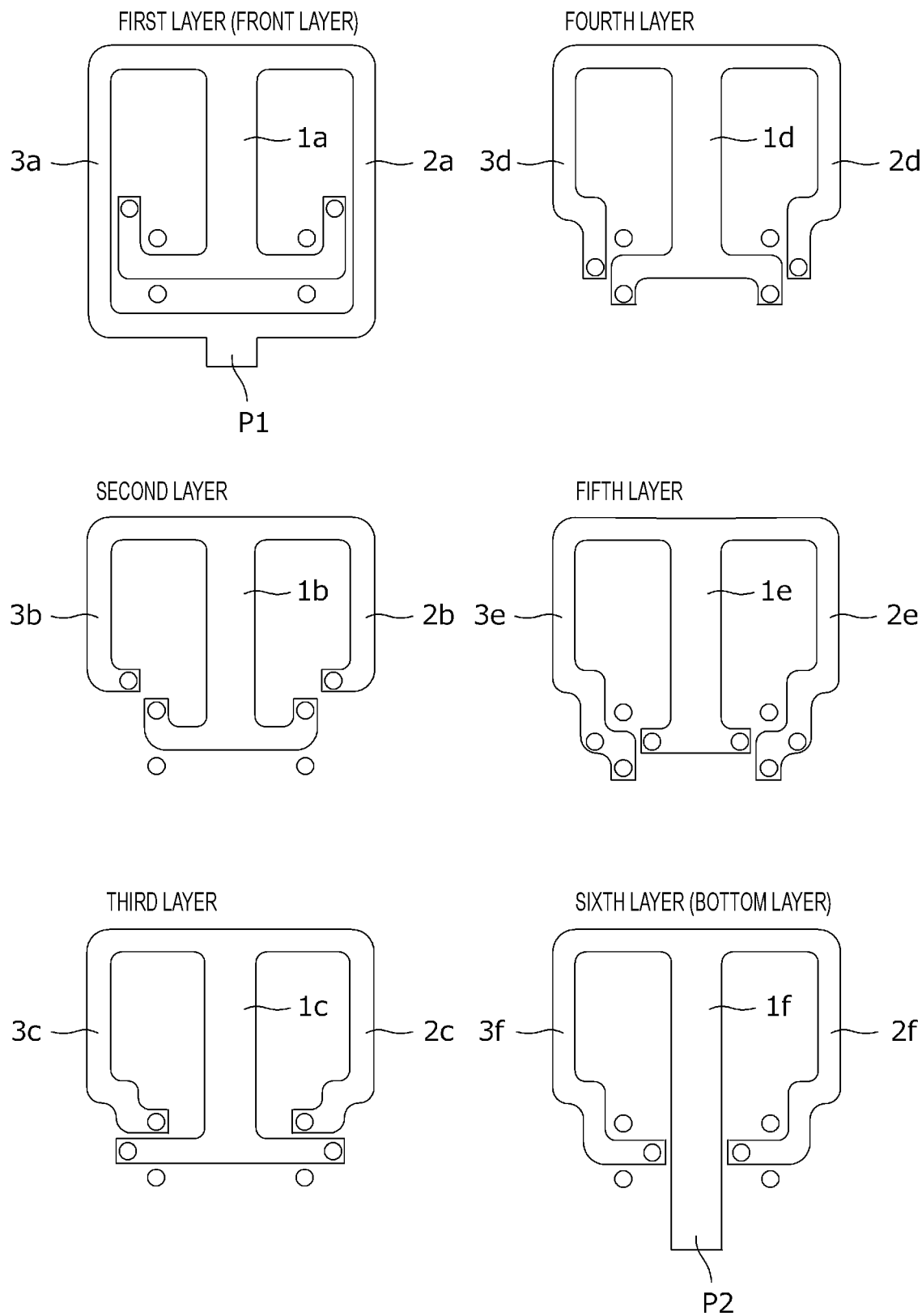
FIG. 16 is an exploded plan view illustrating a structure of a coil of a planar array coil according to a fifth embodiment.

FIG. 16 is an exploded plan view illustrating another structure of a coil of a planar array coil according to a fifth embodiment. An example in which a multilayer substrate is manufactured using a through-via method is illustrated in FIG. 16. As in the examples described in the foregoing embodiments, only coil conductor patterns formed at individual layers of the multilayer substrate are illustrated.

As illustrated in FIG. 16, a central conductor pattern 1*a* and two coil-shaped conductor patterns 2*a* and 3*a* are formed at a first layer, which is a front layer. In a similar manner, a central conductor pattern 1*b* and two coil-shaped conductor patterns 2*b* and 3*b* are formed at a second layer, a central conductor pattern 1*c* and two coil-shaped conductor pattern 2*c* and 3*c* are formed at a third layer, a central conductor pattern 1*d* and two coil-shaped conductor patterns 2*d* and 3*d* are formed at a fourth layer, and a central conductor pattern 1*e* and two coil-shaped conductor patterns 2*e* and 3*e* are formed at a fifth layer. Furthermore, a central conductor pattern 1*f* and two coil-shaped conductor patterns 2*f* and 3*f* are formed at a sixth layer, which is a bottom layer.

A plurality of round patterns in FIG. 16 represent through-vias. End portions of the central conductor pattern 1*a* at the first layer and end portions of the coil-shaped conductor patterns 2*b* and 3*b* at the second layer are connected through through-vias. Furthermore, end portions of the central conductor pattern 1*b* at the second layer and end portions of the coil-shaped conductor patterns 2*c* and 3*c* at the third layer are connected through through-vias. In a similar manner, the central conductor pattern 1*c* at the third layer and end portions of the coil-shaped conductor patterns 2*d* and 3*d* at the fourth layer are connected through through-vias, and end portions of the central conductor pattern 1*d* at the fourth layer and end portions of the coil-shaped conductor patterns 2*e* and 3*e* at the fifth layer are connected through through-vias. Furthermore, end portions of the central conductor pattern 1*e* at the fifth layer and end portions of the coil-shaped conductor patterns 2*f* and 3*f* at the sixth layer are connected through through-vias.

The coil-shaped conductor patterns 2*a* and 3*a* at the first layer are connected and drawn as the first end P1, and an end portion of the central conductor pattern 1*f* at the sixth layer is drawn as the second end P2.

Sixth Embodiment

In a sixth embodiment, an example of a planar array coil including a magnetic sheet is illustrated.

Figure 17:
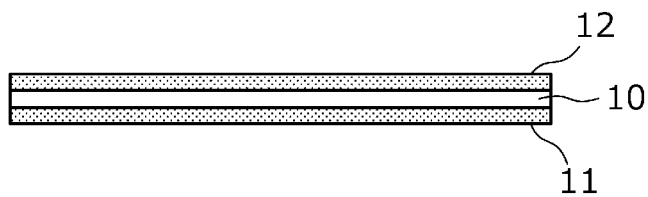
FIG. 17 is a cross-section view of a planar array coil according to a sixth embodiment.

FIG. 17 is a cross-section view of a planar array coil 106 according to the sixth embodiment. A structure of the multilayer substrate 10 illustrated in FIG. 17 is the same as those illustrated in FIG. 1 and so on, and a plurality of coils are arranged at the multilayer substrate 10. Magnetic sheets 11 and 12 are overlaid on individual faces of the multilayer substrate 10. The planar shape of each of the magnetic sheets 11 and 12 is the same as the multilayer substrate 10, and the magnetic sheets 11 and 12 cover the entire faces of the multilayer substrate 10.

The magnetic sheets 11 and 12 are each obtained by, for example, attaching a plurality of thin plates made of magnetic ferrite to a base film or molding silicon rubber or other types of rubber kneaded with magnetic ferrite powder into a sheet shape. The magnetic sheets 11 and 12 operate as magnetic paths for magnetic flux passing through coil openings. The magnetic sheets 11 and 12 also operate as magnetic shield layers.

As described above, when the magnetic sheets 11 and 12 are provided under the condition that the distance D between one coil parts of the coils L1, L2, and L3 is smaller than the opening width W of the coil parts in the direction of the distance D (see FIG. 1), mutual inductance by magnetic coupling between adjacent coils increases. Thus, coils can be arranged closely without reducing the inductance of a single coil. Operational effects of being able to reduce the area of the array coil while achieving a sufficient inductance can be attained.

Figure 18A:
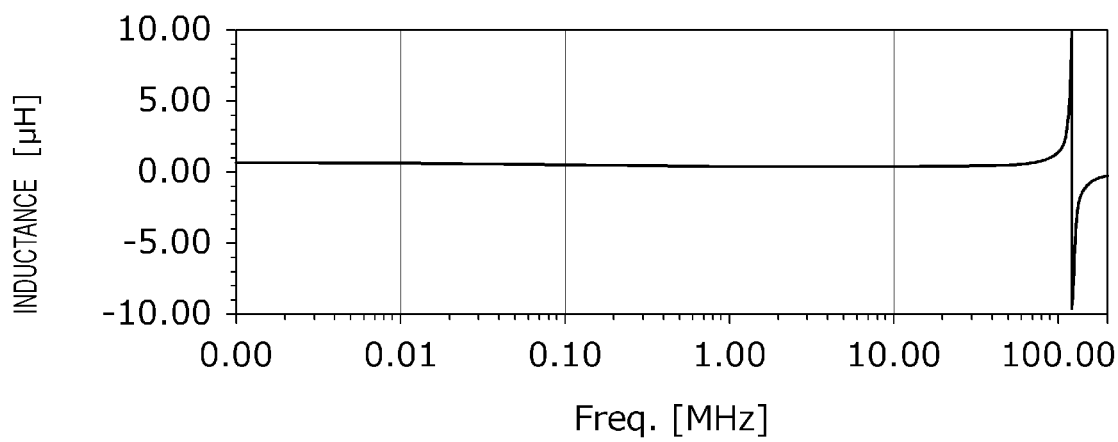
FIG. 18A is a diagram illustrating frequency characteristics of the inductance (reactance) of a coil of the planar array coil.
Figure 18B:
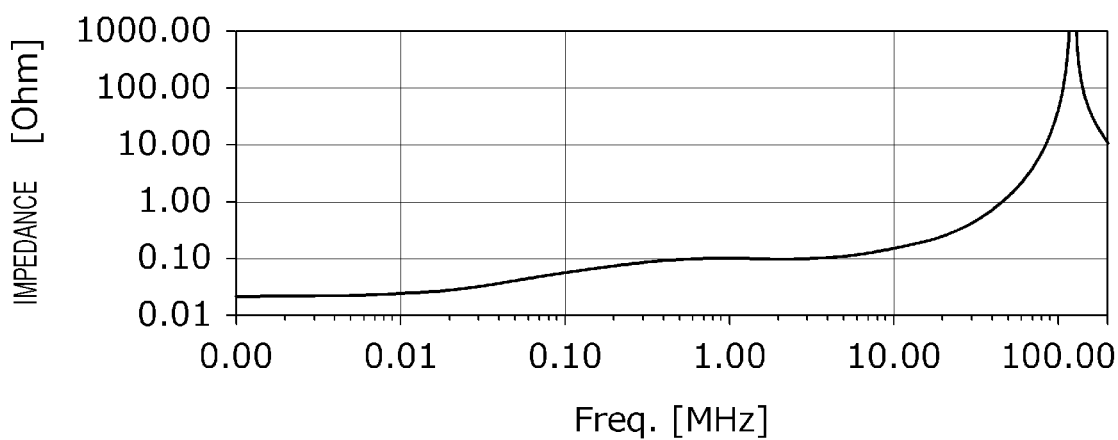
FIG. 18B is a diagram illustrating frequency characteristics of the impedance of the coil of the planar array coil.
Figure 19A:
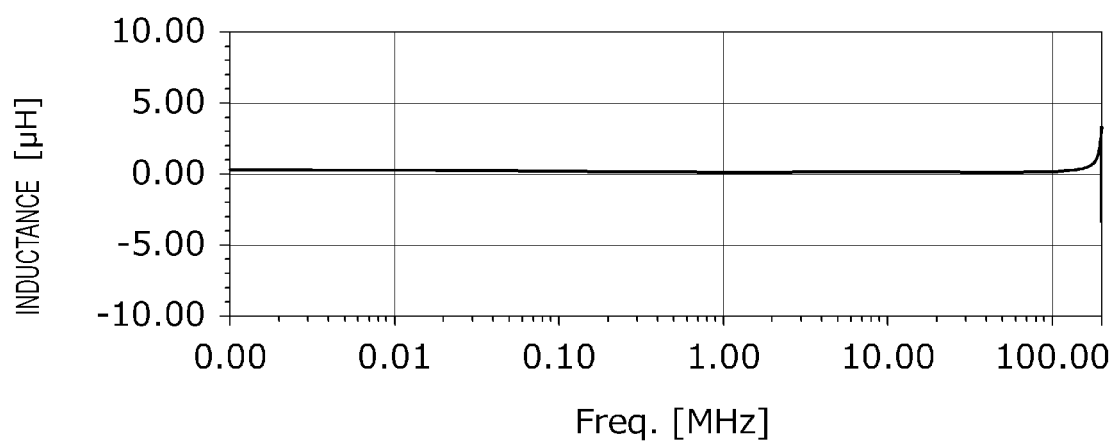
FIG. 19A is a diagram illustrating frequency characteristics of the inductance (reactance) of a coil of a planar array coil according to a comparative example.

FIG. 18A is a diagram illustrating frequency characteristics of the inductance (reactance) of a coil of the planar array coil 106 according to this embodiment, and FIG. 18B is a diagram illustrating frequency characteristics of the impedance of the coil of the planar array coil 106. FIG. 19A is a diagram illustrating frequency characteristics of the inductance (reactance) of a coil of a planar array coil according to a comparative example, and FIG. 19B is a diagram illustrating frequency characteristics of the impedance of the coil of the planar array coil according to the comparative example.

As is clear from FIGS. 18A and 19A, the inductance increases over the frequency range from 10 kHz to 100 MHz. Accordingly, the magnetic sheets 11 and 12 operate as magnetic paths because they have a permeability higher than air and the like, and the self-inductance of the coil thus increases.

Figure 19B:
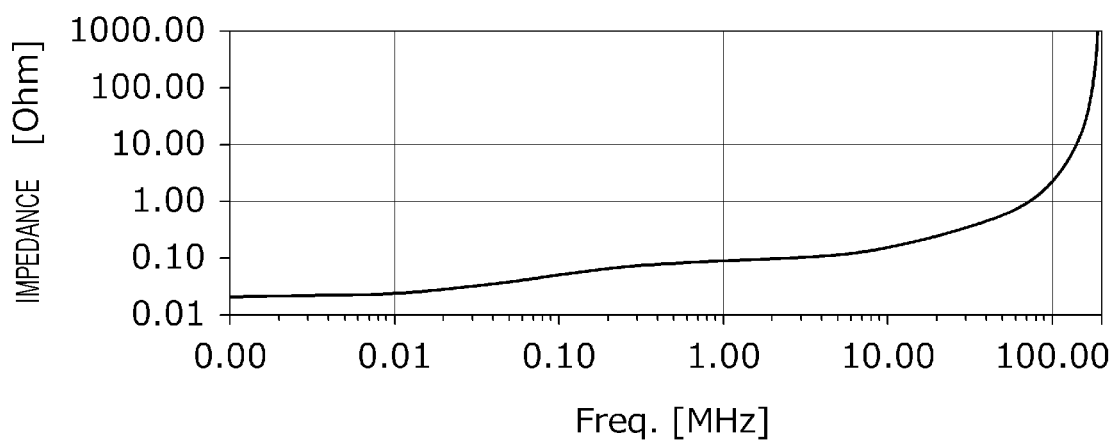
FIG. 19B is a diagram illustrating frequency characteristics of the impedance of the coil of the planar array coil according to the comparative example.

Furthermore, as illustrated in FIGS. 18B and 19B, the impedance of the coil increases in accordance with frequency up to the self-resonant frequency exceeding 100 MHz, and characteristics in which AC resistance increases in accordance with frequency can be obtained.

Seventh Embodiment

In a seventh embodiment, an example of a switching power supply device that includes the planar array coil described above is described.

Figure 20:
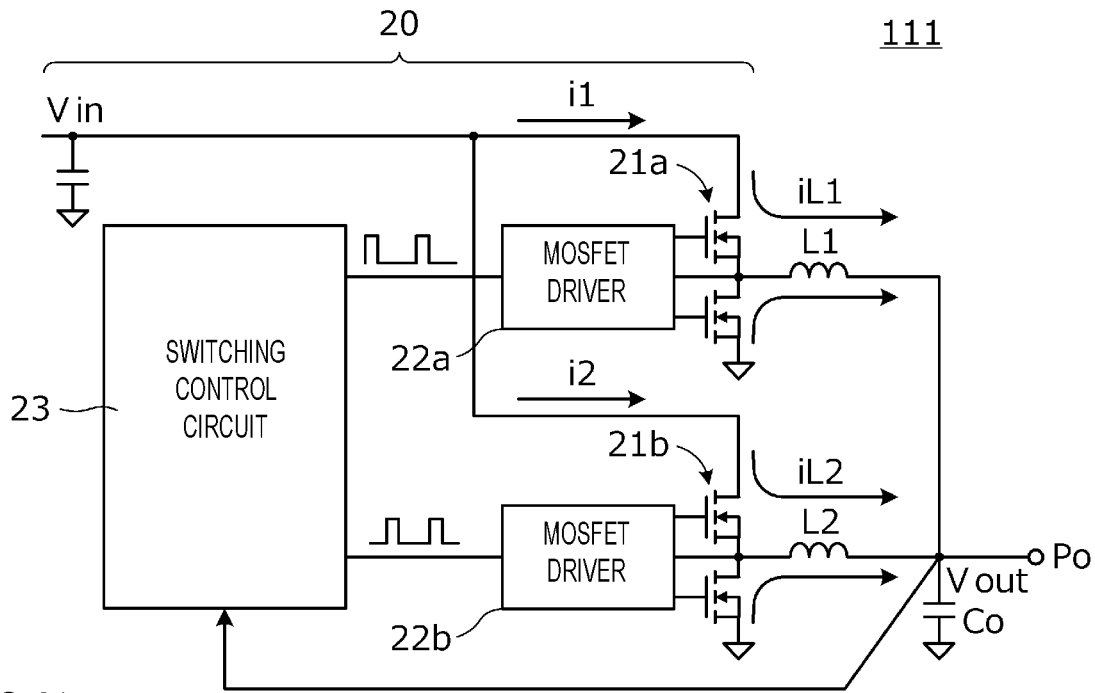
FIG. 20 is a circuit diagram of a switching power supply device according to a seventh embodiment.

FIG. 20 is a circuit diagram of a switching power supply device 111 according to the seventh embodiment. The switching power supply device 111 includes a planar array coil in which the coils L1 and L2 are formed and a power conversion circuit 20. Switching circuit units 21a and 21b of the power conversion circuit 20 each include a high-side MOS-FET and a low-side MOS-FET. A first end of the coil L1 is connected to an output part of the switching circuit unit 21a, and a second end of the coil L1 is connected to a common output part Po. A first end of the coil L2 is connected to an output part of the switching circuit unit 21b, and a second end of the coil L2 is connected to the common output part Po. A smoothing capacitor Co is connected to the output part Po.

A driving circuit 22a is connected between the gate and source of the MOS-FETs of the switching circuit unit 21a, and a driving circuit 22b is connected between the gate and source of the MOS-FETs of the switching circuit unit 21b.

A switching control circuit 23 is connected to the driving circuits 22a and 22b. The switching control circuit 23 outputs driving signals of two phases with a phase difference of 180 degrees to the driving circuits 22a and 22b.

Figure 21:
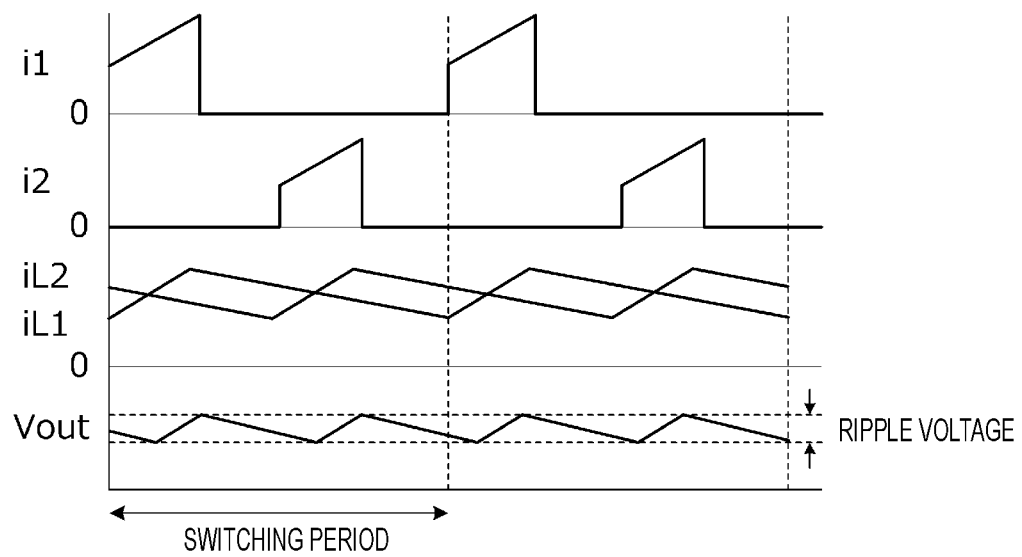
FIG. 21 is a waveform diagram of current and voltage of individual units of the switching power supply device illustrated in FIG. 20.

FIG. 21 is a waveform diagram of voltage and current in individual units of the switching power supply device illustrated in FIG. 20. In FIG. 21, current i1 represents input current flowing to the switching circuit unit 21a, and current i2 represents input current flowing to the switching circuit unit 21b. Furthermore, current iL1 represents current flowing in the coil L1, and current iL2 represents current flowing in the coil L2. Voltage Vout represents output voltage of the output part Po.

The phase difference in the waveform of current between the input currents i1 and i2 is 180 degrees, and the phase difference in waveform between current flowing in the coil L1 and current flowing in the coil L2 is also 180 degrees. In the example illustrated in FIGS. 20 and 21, the switching power supply device of two phases including two coils is provided. Thus, during a switching period, two sets of switching operation are performed, and the waveform of two excitation currents in coil current can be obtained.

Figure 22:
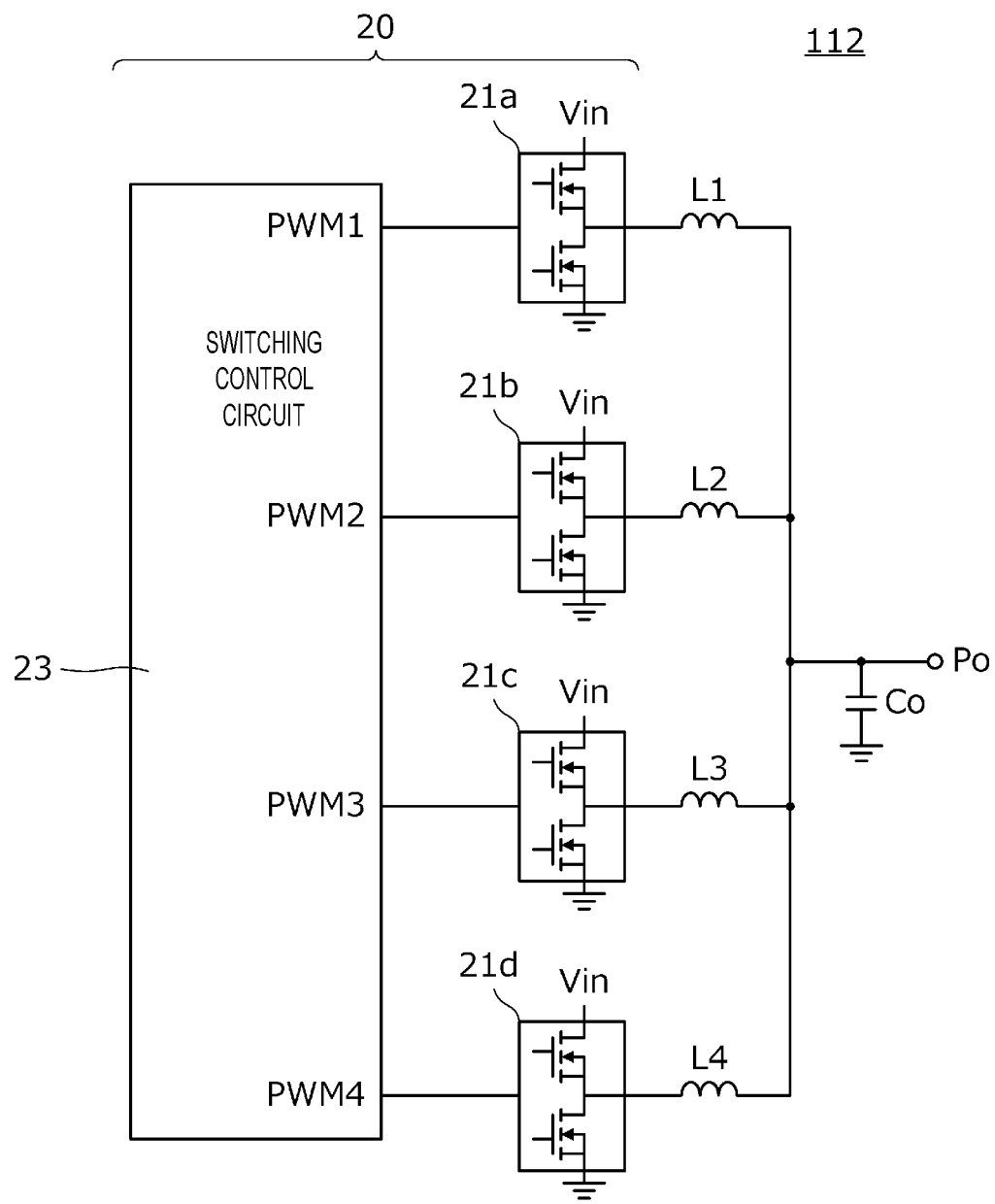
FIG. 22 is a circuit diagram of a switching power supply device 112 including a planar array coil in which four coils L1, L2, L3, and L4 are formed and a power conversion circuit 20.

FIG. 22 is a circuit diagram of a switching power supply device 112 that includes a planar array coil in which four coils L1, L2, L3, and L4 are formed and the power conversion circuit 20. Switching circuit units 21a, 21b, 21c, and 21d of the power conversion circuit 20 each include a high-side MOS-FET and a low-side MOS-FET. First ends of the coils L1, L2, L3, and L4 are connected to output parts of the switching circuit units 21a, 21b, 21c, and 21d, respectively, and second ends of the coils L1, L2, L3, and L4 are connected to a common output part Po.

Driving circuits, which are not illustrated in FIG. 22, are connected to the switching circuit units 21a, 21b, 21c, and 21d, and output parts (PWM1, PWM2, PWM3, and PWM4) are connected to the driving circuits for the switching control circuit 23. The switching control circuit 23 outputs, via the output parts (PWM1, PWM2, PWM3, and PWM4), driving signals of four phases with a phase difference of 90 degrees to the driving circuits.

As described above, with the switching power supply device of four phases, the phase difference in waveform between input currents flowing to the switching circuit units 21a, 21b, 21c, and 21d is 90 degrees, and the phase difference in waveform between currents flowing in the coils L1, L2, L3, and L4 is also 90 degrees. Thus, during a switching period, four sets of switching operation are performed.

The switching control circuit 23 illustrated in FIG. 22 is a multi-phase PWM controller and can also control the number of switching circuit units to be used, out of the plurality of switching circuit units 21a to 21d, according to the size of a load. That is, the switching control circuit 23 operates in a single phase when the load is minimum, operates in four phases when the load is maximum, and operates in two phases or three phases when the load is medium.

Figure 23:
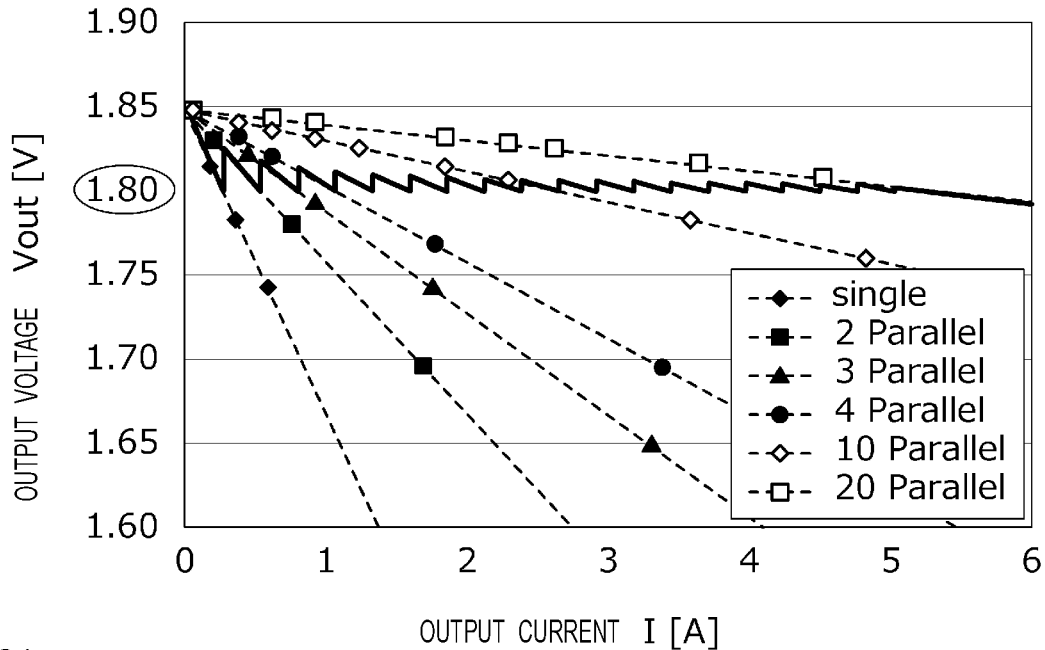
FIG. 23 is a diagram illustrating the relationship between output current and output voltage in the case where the number of switching circuit units that perform parallel control varies depending on the size of a load.

FIG. 23 is a diagram illustrating the relationship between output current and output voltage in the case where the number of switching circuit units that perform parallel control varies depending on the size of a load. In this example, the number of switching circuit units that perform parallel control in the case where the load is minimum is one (single-phase control), and the number of switching circuit units that perform parallel control in the case where the load is maximum is twenty (20-phase control).

In the example of FIG. 23, the number of switching circuit units that perform parallel control is set to minimum without the output voltage Vout dropping below 1.8 V. In the case where the ON duty ratio is represented by D, the input voltage is represented by Vin, the number of switching circuit units that perform parallel control is represented by N, a resistance component of a switching circuit unit and a coil is represented by r, and the output current is represented by I, the relationship of Vout=D·Vin−(r/N)I is obtained. Thus, by controlling the number N of switching circuit units that perform parallel control according to the size of the load, substantially a constant output voltage Vout can be achieved.

Figure 24:
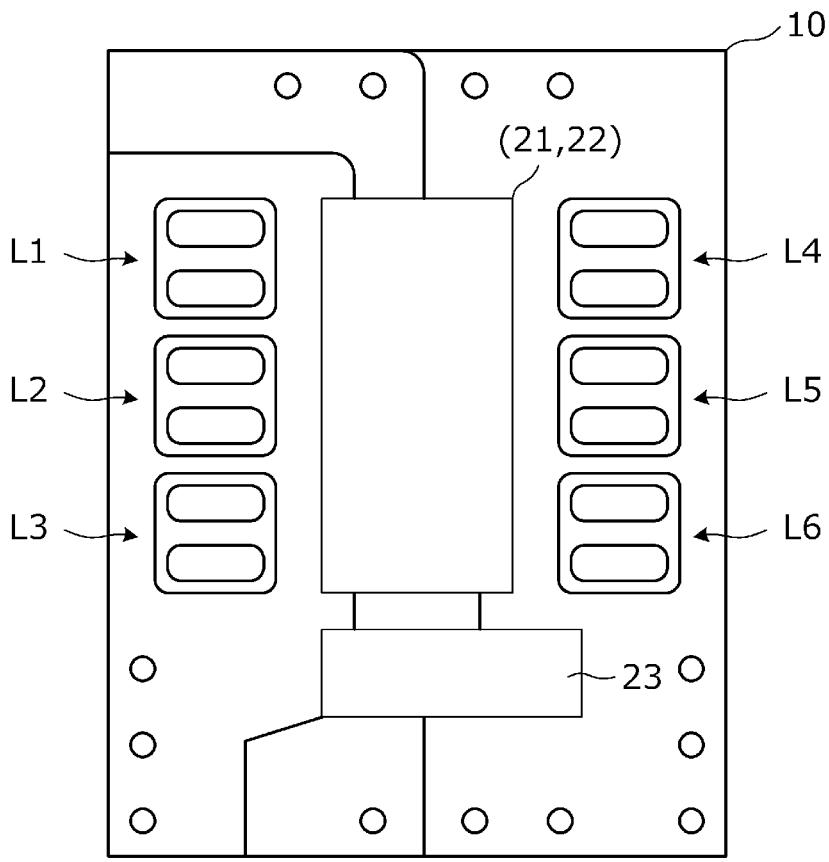
FIG. 24 is a plan view of a switching power supply device formed at a multilayer substrate.

Next, an example of the configuration on a circuit substrate of the switching power supply device according to this embodiment will be described. FIG. 24 is a plan view of the switching power supply device formed at the multilayer substrate 10. Coils L1, L2, L3, L4, L5, and L6 are formed at the multilayer substrate 10. The coils L1, L2, and L3 form a planar array coil, and the coils L4, L5, and L6 form another planar array coil. Conductor patterns of the coils L1, L2, L3, L4, L5, and L6 are illustrated in a simplified manner. The configuration of the planar array coils including the plurality of coils is the same as that illustrated in FIG. 1 and so on. A switching circuit unit 21 and a driving circuit 22 are provided between the two planar array coils. The configuration of the switching circuit unit 21 is the same as those of the switching circuit units 21a to 21d illustrated in FIGS. 20 and 22. The configuration of the driving circuit 22 is the same as those of the driving circuits 22a and 22b illustrated in FIG. 20. A switching control circuit 23 is provided near the switching circuit unit 21 and the driving circuit 22.

As described above, a switching power supply device that includes a planar array coil in which the distance between adjacent coils is reduced so that a plurality of coils are arranged in a limited space at a multilayer substrate can be configured.

Finally, the embodiments described above are illustrative and non-restrictive in every respect. Changes and modifications can be made in an appropriate manner by those skilled in the art. The scope of the present disclosure is defined by the scope of the claims, not by the embodiments described above, and is intended to include any modification to an embodiment within the scope and meaning equivalent to the scope of the claims.

What is claimed is:

1. A planar array coil comprising:
a multilayer substrate at which a plurality of coils are disposed,
wherein
each of the plurality of coils has conductor patterns at the multilayer substrate and is arranged on a plane of the multilayer substrate,
each of the plurality of coils includes two coil parts in which currents flow in opposite rotation directions,
the plurality of coils are arranged such that one of the coil parts of one of the coils is adjacent to one of the coil parts of an other one of the coils, and
a distance between the one coil part of the one of the coils and the one coil part of the other one of the coils is equal to or smaller than an opening width of a respective opening in each of the one of the coils and the other one of the coils in a direction of the distance.

2. The planar array coil according to claim 1, further comprising:
a magnetic sheet that is laminated on the multilayer substrate and covers the plurality of coils when the multilayer substrate is viewed in plan.

3. The planar array coil according to claim 1, wherein
the conductor patterns include coil conductor patterns that are at a plurality of base material layers included in the multilayer substrate and an interlayer connection conductor that allows connection between the coil conductor patterns through layers,
the coil conductor patterns at the plurality of base material layers each include a linear-shaped central conductor pattern and coil-shaped conductor patterns on both sides across the central conductor pattern, and
the central conductor pattern and the coil-shaped conductor patterns are connected as a current path and are configured as the two coil parts.

4. The planar array coil according to claim 3, wherein
each of the coil-shaped conductor patterns is a ring-shaped conductor pattern with less than one turn.

5. The planar array coil according to claim 3, wherein
each of the coil-shaped conductor patterns is a spiral-shaped conductor pattern with one or more turns.

6. The planar array coil according to claim 3, wherein
of the plurality of base material layers at which the coil conductor patterns are disposed, coil conductor patterns at an intermediate layer sandwiched between a bottom layer and a front layer include coil conductor patterns of two types, and
the coil conductor patterns of the two types are arranged alternately in a lamination direction of the multilayer substrate.

7. A switching power supply device comprising:
the planar array coil according to claim 1 and a power conversion circuit, wherein
first ends of the plurality of coils are connected to switching circuit units of the power conversion circuit, and second ends of the plurality of coils are connected to a common output part, and
when the switching circuit units cause current to flow to the plurality of coils in multiple phases, currents in regions of the adjacent coil parts that extend in parallel to each other flow in a same direction.

8. The planar array coil according to claim 1, further comprising:
a magnetic sheet that is laminated on the multilayer substrate and covers the plurality of coils when the multilayer substrate is viewed in plan.

9. The planar array coil according to claim 1, wherein
the conductor patterns include coil conductor patterns that are at a plurality of base material layers included in the multilayer substrate and an interlayer connection conductor that allows connection between the coil conductor patterns through layers,
the coil conductor patterns at the plurality of base material layers each include a linear-shaped central conductor pattern and coil-shaped conductor patterns on both sides across the central conductor pattern, and
the central conductor pattern and the coil-shaped conductor patterns are connected as a current path and are configured as the two coil parts.

10. The planar array coil according to claim 2, wherein
the conductor patterns include coil conductor patterns that are at a plurality of base material layers included in the multilayer substrate and an interlayer connection conductor that allows connection between the coil conductor patterns through layers, the coil conductor patterns at the plurality of base material layers each include a linear-shaped central conductor pattern and coil-shaped conductor patterns on both sides across the central conductor pattern, and the central conductor pattern and the coil-shaped conductor patterns are connected as a current path and are configured as the two coil parts.

11. The planar array coil according to claim 4, wherein of the plurality of base material layers at which the coil conductor patterns are disposed, coil conductor patterns at an intermediate layer sandwiched between a bottom layer and a front layer include coil conductor patterns of two types, and the coil conductor patterns of the two types are arranged alternately in a lamination direction of the multilayer substrate.

12. The planar array coil according to claim 5, wherein of the plurality of base material layers at which the coil conductor patterns are disposed, coil conductor patterns at an intermediate layer sandwiched between a bottom layer and a front layer include coil conductor patterns of two types, and the coil conductor patterns of the two types are arranged alternately in a lamination direction of the multilayer substrate.

13. A switching power supply device comprising:
the planar array coil according to claim 1 and a power conversion circuit, wherein first ends of the plurality of coils are connected to switching circuit units of the power conversion circuit, and second ends of the plurality of coils are connected to a common output part, and when the switching circuit units cause current to flow to the plurality of coils in multiple phases, currents in regions of the adjacent coil parts that extend in parallel to each other flow in a same direction.

14. A switching power supply device comprising:
the planar array coil according to claim 6 and a power conversion circuit, wherein first ends of the plurality of coils are connected to switching circuit units of the power conversion circuit, and second ends of the plurality of coils are connected to a common output part, and when the switching circuit units cause current to flow to the plurality of coils in multiple phases, currents in regions of the adjacent coil parts that extend in parallel to each other flow in a same direction.

15. The planar array coil according to claim 1, wherein the conductor patterns include coil conductor patterns disposed at a plurality of base material layers included in the multilayer substrate, respectively, of the plurality of base material layers at which the coil conductor patterns are disposed, coil conductor patterns sandwiched between a bottom layer and a front layer of the one of the coils and the other one of the coils include the coil parts of the one of the coils and the adjacent other one of the coils, and base material of the base material layers exists between outermost side portions of the coil parts facing one another.

* * * * *